US012704768B2

(12) United States Patent
Jones et al.

(10) Patent No.: US 12,704,768 B2
(45) Date of Patent: Aug. 11, 2026

(54) BACKDROP-AND-LIGHTING HANGING KIT

(71) Applicants: Gary Lynn Jones, Powder Springs, GA (US); Carol Elaine Jones, Powder Springs, GA (US)

(72) Inventors: Gary Lynn Jones, Powder Springs, GA (US); Carol Elaine Jones, Powder Springs, GA (US)

( * ) Notice: Subject to any disclaimer, the term of this patent is extended or adjusted under 35 U.S.C. 154(b) by 156 days.

(21) Appl. No.: 18/883,871

(22) Filed: Sep. 12, 2024

(65) Prior Publication Data

US 2025/0085613 A1 Mar. 13, 2025

Related U.S. Application Data

(60) Provisional application No. 63/582,157, filed on Sep. 12, 2023.

(51) Int. Cl.
*G03B 15/08* (2021.01)
*F16M 13/02* (2006.01)

(52) U.S. Cl.
CPC ........... *G03B 15/08* (2013.01); *F16M 13/022* (2013.01)

(58) Field of Classification Search
CPC ................................................ G03B 15/06–07
See application file for complete search history.

(56) References Cited

U.S. PATENT DOCUMENTS 1,341,742 A 6/1920 Fisher
3,967,301 A * 6/1976 Corning ................. G03B 15/02 396/3
5,235,368 A * 8/1993 Oglesbee ............... G03B 15/06 396/3

(Continued)

FOREIGN PATENT DOCUMENTS

CN 211207043 U 8/2020

OTHER PUBLICATIONS

Photo.net Forum thread titled "Creating a backdrop stand with light stands" at https://www.photo.net/forums/topic/458696-creating-a-backdrop-stand-with-light-stands/ (dated Nov. 2012) (Year: 2012).*

(Continued)

*Primary Examiner* — Leon W Rhodes, Jr.

(57) ABSTRACT

A backdrop-and-lighting hanging kit is a kit that allows the user to setup different photography backdrops and accessories in a single support assembly to maintain a clean setup and work space. The kit generally includes several elongated supports and accessory mounts. The elongated supports are existing support devices that help construct the desired support assembly. The accessory mounts connect the corresponding elongated supports together to construct the support assembly. The accessory mounts also facilitate the mounting of photography lights and accessories to the support assembly to maintain a clean and organized work space. Each of the accessory mounts includes a mount body, an accessory-attachment mechanism, and a support-attachment mechanism. The support-attachment mechanism allows the removable attachment of the mount body to an elongated support. The mount body supports the accessory-attachment mechanism and the mounted accessory. Further, the accessory-attachment mechanism allows the secure mounting of an accessory to the mount body.

14 Claims, 50 Drawing Sheets

(56) References Cited

U.S. PATENT DOCUMENTS

| | | | | |
|---|---|---|---|---|
| 7,680,401 | B1 * | 3/2010 | Adelstein | G03B 17/56<br>396/3 |
| 12,228,843 | B2 * | 2/2025 | Munoz | G03B 15/06 |
| 2019/0282017 | A1 | 9/2019 | Hanley et al. | |

OTHER PUBLICATIONS

Manfrotto Double SuperClamp product listing, https://web.archive.org/web/20201120010423/https://www.manfrotto.com/us-en/cast-alloy-double-super-clamp-038/ Archive.org copy dated 2020 (Year: 2020).*

Kirsch, Kirsch Swivel Socket for 1 3/8" Wood Drapery Rods, Retrieved From Internet, Retrieved on Sep. 12, 2024, <URL: https://www.designerdraperyhardware.com/kirsch-drapery-hardware-1-3-8-inch-wood-trends-classic-accessories-swivel-socket-10074/?gad=1&gclid=CjwKCAjw-7OIBhB8EiwAnoOEk9vGTy-llh9ZTSh705Uk3719MKgaNBVR01frzvp3Tp660FpmApmjtBoCtA8QAvD_BwE>.

Symple Stuff, Perryman Adjustable 2" Mounting Bracket, Retrieved From Internet, Retrieved on Sep. 12, 2024, <URL: https://www.wayfair.com/decor-pillows/pdp/symple-stuff-perryman-adjustable-2-mounting-bracket-w000244982.html?piid=963570016>.

Select, Select 4 1/4" to 5 1/2" Adjustable Return Metal Bracket for 2 1/4" Wood Drapery Rods, Retrieved Frominternet, Retrieved on Sep. 12, 2024, <URL: https://www.designerdraperyhardware.com/select-drapery-rods-2-1-4-inch-wood-drapery-brackets-5-1-4-inch-return-metal-bracket-12566/?gad=1&gclid=CjwKCAjw-7OIBhB8EiwAnoOEk5uXzKhFnjiSllhjKVLfTZQcpeYHZwO1QB5bCmzyTalK6ViZDL-9lhoCUOoQAvD_BwE>.

* cited by examiner

BACKDROP-AND-LIGHTING HANGING KIT

The current application claims a priority to the U.S. provisional patent application Ser. No. 63/582,157 filed on Sep. 12, 2023.

FIELD OF THE INVENTION

The present invention relates generally to a support systems for backdrops and lighting systems. More specifically, the present invention discloses a system that allows the quick assembly of a custom support structure that supports various backdrops and lighting accessories for different applications, such as for photography.

BACKGROUND OF THE INVENTION

Photography backdrops are versatile tools that provide means to craft visually captivating and controlled backgrounds for photography sessions. Functioning as a canvas situated behind the subject, photography backdrops play a pivotal role in enhancing the overall composition and setting of the photographs. Available in a diverse range of materials, colors, patterns, and sizes, photography backdrops cater to the varying styles and themes photographers aim to capture. To achieve compelling and striking images using backdrops, proper setup, adept lighting, and effective coordination with the subject are essential elements. To setup the desired backdrops and necessary lighting, various stands, poles, and clamps are often used to prop up the backdrops in the desired location and orientation. However, traditional backdrop and lighting support systems have many limitations. For example, many of the existing systems do not support multiple backdrops from being displayed simultaneously in different orientations if desired. Further, while some systems allow the attachment of additional accessories to the backdrop, such as lights or additional stands, the resulting setup can be crowded and difficult to disassemble afterwards.

Therefore, an objective of the present invention is to provide a backdrop-and-lighting hanging kit that enables several backdrops to be set up simultaneously at different orientations. The present invention allows the user to set up different backdrops using the same support assembly at different orientations if desired. The user can utilize existing support devices (e.g., telescopic poles, speaker stands, metal strips or plates, etc.) with the present invention to construct the appropriate support assembly that accommodates the desired backdrops. Another objective of the present invention is to provide a backdrop-and-lighting hanging kit that can accommodate several accessories, such as photography lights. The present invention can support different photography accessories that can be mounted onto the constructed support assembly without the need of additional support devices. Thus, a single support assembly can be used to hang the desired backdrops and photography accessories. Additional features and benefits of the present invention are further discussed in the sections below.

SUMMARY OF THE INVENTION

The present invention discloses a backdrop-and-lighting hanging kit. The backdrop-and-lighting hanging kit allows users to construct a support assembly for photography backdrops and accessories using existing support structures or devices. To do so, the present invention includes several accessory mounts that allow the use of existing support devices to construct the desired support assembly. Different accessory mounts are provided to accommodate different support devices that can include, but are not limited to, telescopic poles, speaker/lighting stands, metal strips, metal plates, existing walls/ceilings, etc. Further, the accessory mounts of the present invention allow for a modular construction that can accommodate several photography backdrops at different orientations if desired. For example, the present invention can be used to set up a single backdrop or multiple backdrops oriented at different angles with each other. Furthermore, the present invention can accommodate several photography accessories in the same support assembly to maintain a clean setup area that can be easily adjusted and disassembled if desired.

DETAILED DESCRIPTION OF THE INVENTION

Figure 1:
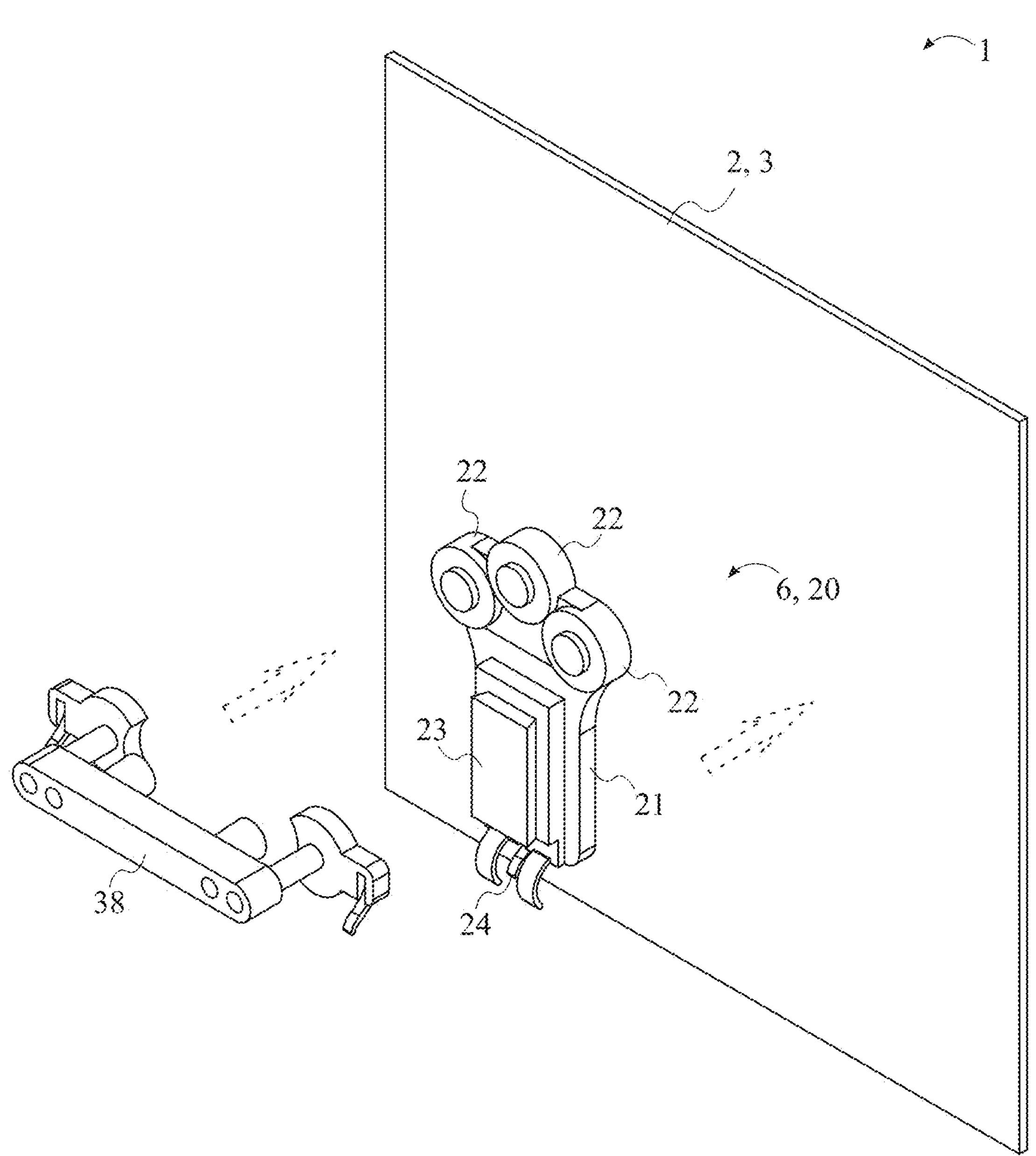
FIG. 1 is a top-front-left exploded perspective view of the present invention, wherein a first magnetic embodiment of the support-attachment mechanism is shown used for a metal base embodiment of the specific elongated support.

All illustrations of the drawings are for the purpose of describing selected versions of the present invention and are not intended to limit the scope of the present invention.

The present invention discloses a backdrop-and-lighting hanging kit. The backdrop-and-lighting hanging kit allows the user to more freely setup different photography backdrops and accessories in a single support assembly to maintain a clean setup space. In the preferred embodiment, the present invention comprises a plurality of elongated supports 1 and a plurality of accessory mounts 6. As can be seen in FIGS. 1 through 48, the plurality of elongated supports 1 corresponds to existing support devices that can be used to construct the desired support assembly. The plurality of accessory mounts 6 includes several devices that connect the corresponding elongated supports together to construct the desired support assembly. In addition, the plurality of accessory mounts 6 includes several devices that facilitate the mounting of photography lights 34 and accessories to the constructed support assembly to maintain a clean and organized work space.

The general configuration of the aforementioned components enables the user to set up the necessary photography backdrops and accessories without crowding the work space and giving the photographer more creative freedom. As can be seen in FIGS. 1 through 48, the plurality of accessory mounts 6 include several modular devices that accommodate different types of elongated supports of the plurality of elongated supports 1. In addition, the different accessory mounts of the plurality of accessory mounts 6 allow for different photography accessories to be mounted onto the constructed support assembly. In general, each of the plurality of accessory mounts 6 comprises a mount body 7, an accessory-attachment mechanism 8, and a support-attachment mechanism 20. The support-attachment mechanism 20 allows the removable attachment of the mount body 7 to the corresponding elongated support. The mount body 7 supports the accessory-attachment mechanism 8 and the desired photography accessory. Further, the accessory-attachment mechanism 8 allows the secure mounting of the photography accessory to the mount body 7.

As can be seen in FIGS. 1 through 48, the accessory-attachment mechanism 8 is connected adjacent to the mount body 7 to form a single support structure that can accommodate the desired photography accessory. In addition, the support-attachment mechanism 20 is attached adjacent to the mount body 7, offset from the accessory-attachment mechanism 8, so that the accessory-attachment mechanism 8 and the mount body 7 can be removably attached to the corresponding elongated support using the support-attachment mechanism 20. Further, at least one specific elongated support 2 from the plurality of elongated supports 1 and at least one specific accessory mount 32 from the plurality of accessory mounts 6 can be arranged into an operative configuration that helps construct the support assembly. The specific elongated support 2 and the specific accessory mount 32 are used to hold in place at least one backdrop pole 33 and/or at least one photography light 34 once the desired support assembly has been constructed. Different accessory mounts of the plurality of accessory mounts 6 can be implemented to form different portions of the support assembly. For example, some accessory mounts of the plurality of accessory mounts 6 can serve as corner pieces that connect the corresponding elongated supports of the plurality of elongated supports 1 to form an overall upright support assembly that hangs one or more photography backdrops. In addition, other accessory mounts of the plurality of accessory mounts 6 can be utilized to mount the desired photography accessories in different locations around the constructed support assembly. In other embodiments, different components can be implemented to mount other devices.

As previously discussed, different existing support devices can serve as elongated supports of the plurality of elongated supports 1 to form the desired support assembly. In some embodiments, the specific elongated support 2 is at least one metal base 3 that can be fastened to an existing wall or other supportive surface. As can be seen in FIGS. 1 through 12 and 41 through 48, the at least one metal base 3 can be an elongated metal strip of different sizes that can be fastened to the selected surface using the appropriate fasteners including, but not limited to, screws, nails, etc. Further, the at least one metal base 3 can be a metal panel of different shapes and sizes that can be incorporated into an existing surface or fastened to the existing surface using the appropriate fasteners. Several metal bases 3 can be implemented to form the desired support assembly, and each metal base 3 can be arranged into different orientations and configurations. Additionally, the metal bases can be combined with other elongated supports as necessary.

As can be seen in FIGS. 1 through 12 and 41 through 48, to allow the attachment of the specific accessory mount 32 to the at least one metal base 3, the specific accessory mount 32 is designed as a magnetic accessory mount that can be removably mounted onto the at least one metal base 3 using magnetism. The magnetic embodiment of the specific accessory mount 32 allows the desired photography backdrops or accessories, such as lights, to be directly mounted from the wall or surface that is equipped with the at least one metal base 3. So, the support-attachment mechanism 20 of the specific accessory mount 32 may comprise a support-attachment base 21, a plurality of support-attachment magnets 22, a support-attachment adapter 23, and a plurality of release levers 24. The support-attachment base 21 corresponds to the main structure of the support-attachment mechanism 20. The support-attachment base 21 can include different shapes and sizes to accommodate the plurality of support-attachment magnets 22, the support-attachment adapter 23, and the plurality of release levers 24. The plurality of support-attachment magnets 22 enable the magnetic coupling of the support-attachment base 21 to the at least one metal base 3. The support-attachment adapter 23 allows the removable attachment of the mount body 7 to the support-attachment base 21. Further, the plurality of release levers 24 enables the quick and safe removal of the support-attachment base 21 from the at least one metal base 3.

In this magnetic embodiment, the support-attachment mechanism 20 can be arranged as follows: the plurality of support-attachment magnets 22 is serially connected into the support-attachment base 21 to secure each of the support-attachment magnets 22 to the support-attachment base 21, as can be seen in FIGS. 1 through 12 and 41 through 48. Several slots can be formed on the support-attachment base 21 to accommodate the plurality of support-attachment magnets 22. In addition, appropriate fasteners can be utilized to secure each of the plurality of support-attachment magnets 22 to the support-attachment base 21. The plurality of support-attachment magnets 22 is also magnetically engaged along the at least one metal base 3 to removably attach the support-attachment base 21 to the at least one metal base 3. Further, the support-attachment adapter 23 is connected adjacent to the support-attachment base 21, offset from the plurality of support-attachment magnets 22, to integrate the support-attachment adapter 23 onto the support-attachment base 21. The support-attachment adapter 23 is preferably the pin portion of a dovetail joint that receives the socket portion of the dovetail joint integrated into the mount body 7. This way, the mount body 7 of different accessory mounts of the plurality of accessory mounts 6 can be attached to the same support-attachment base 21 of a support-attachment mechanism 20.

Further, the plurality of release levers 24 is positioned offset from each other to facilitate the release of the support-attachment base 21 from the at least one metal base 3. As can be seen in FIGS. 1 through 12, each of the plurality of release levers 24 can be a curved lever with a protruding end that can be selectively engaged to release or lock the specific support-attachment mechanism 20 onto the at least one metal base 3. Further, the plurality of release levers 24 is operatively integrated into the support-attachment body, wherein the plurality of release levers 24 is used to disengage the plurality of support-attachment magnets 22 from the metal strip. For example, when the plurality of release levers 24 is set to lock in place, the protrusion of each release lever 24 is retracted to allow each of the plurality of support-attachment magnets 22 to engage with the at least one metal base 3. Alternatively, when the plurality of release levers 24 is set to release, the protrusion of each release lever 24 is moved to push against the at least one metal base 3, which separates the plurality of support-attachment magnets 22 from the at least one metal base 3. Furthermore, each support attachment mechanism can comprise an adjustment knob that is threadably fastened into the support-attachment base 21. The adjustment knob can be used to keep the support-attachment base 21 parallel to the wall or surface onto which the at least one metal base 3 is fastened to. For example, when the adjustment knob is tightened, the adjacent portion of the support-attachment base 21 is separated from the at least one metal base 3. Alternatively, when the adjustment knob is loosened, the adjacent portion of the support-attachment base 21 is moved closer to the at least one metal base 3.

In other embodiments, different configuration features can be implemented to further facilitate the setup of the specific accessory mount 32. For example, the support-attachment adapter 23 can be slidably mounted along the support-attachment base 21 so that the position of the support-attachment adapter 23 along the support-attachment base 21 can be adjusted. In this embodiment, a spring-loaded knob can be implemented that engages a plurality of adjustment orifices linearly distributed along the support-attachment base 21 adjacent to the support-attachment adapter 23. This way, the user can pull the spring-loaded knob to release the support-attachment adapter 23 so that the user can reposition the support-attachment adapter 23 to the desired location. Once the desired position is achieved, the user can let go of the spring-loaded knob so that the spring-loaded knob can be engaged the adjustment orifice corresponding to the desired position of the support-adjustment adapter.

As previously discussed, the at least one metal base 3 can be different metal support devices that can be arranged in different configurations according to the needs of the desired support assembly. To accommodate the different versions of the at least one metal base 3, the magnetic version of the support-attachment mechanism 20 can be provided in different embodiments that accommodate each version of the at least one metal base 3. As can be seen in FIGS. 1 through 8 and 41 through 48, in a horizontal embodiment, when a horizontal metal strip or metal panel is used as the at least one metal base 3, the support-attachment base 21 is positioned perpendicular to the at least one metal base 3. The plurality of support-attachment magnets 22 is arranged in a horizontal arrangement matching the horizontal orientation of the metal strip. For example, when using a horizontal metal strip, the plurality of support-attachment magnets 22 can be arranged in a linear horizontal pattern on the support-attachment base 21 that is perpendicular to the support-attachment adapter 23. When using a metal panel, the plurality of support-attachment magnets 22 can be arranged in an arched pattern, with the support-attachment magnets 22 more evenly spread out so that the plurality of support-attachment magnets 22 engage a wider area of the metal panel. As a result, the horizontal version of each of the support-attachment mechanism 20 generally has an overall T-shaped structure. Further, each of the plurality of release levers 24 is positioned at opposite ends of the plurality of support-attachment magnets 22. Further, the adjustment knob is positioned opposite the plurality of support-attachment magnets 22 across the support-attachment adapter 23.

As can be seen in FIGS. 9 through 12 and 41 through 48, in a vertical embodiment, when a vertical metal strip is used as the at least one metal base 3, the support-attachment base 21 is positioned parallel to the at least one metal base 3. The plurality of support-attachment magnets 22 is arranged in a linear arrangement matching the vertical orientation of the metal strip. So, the support-attachment mechanism 20 has an overall I-shaped structure. Further, the plurality of release levers 24 is terminally positioned on the support-attachment base 21, opposite to the plurality of support-attachment magnets 22 across the support-attachment adapter 23. To maintain the mount body 7 in an upright position, the support-attachment adapter 23 is also oriented parallel to the linear arrangement of the plurality of support-attachment magnets 22 as well as the metal strip. In addition, the vertical embodiment of the support-attachment mechanism 20 can include a plurality of finger pulls positioned adjacent to the plurality of release levers 24 to provide the user with additional means to release the plurality of support-attachment magnets 22 from the vertical magnet strip.

Figure 2:
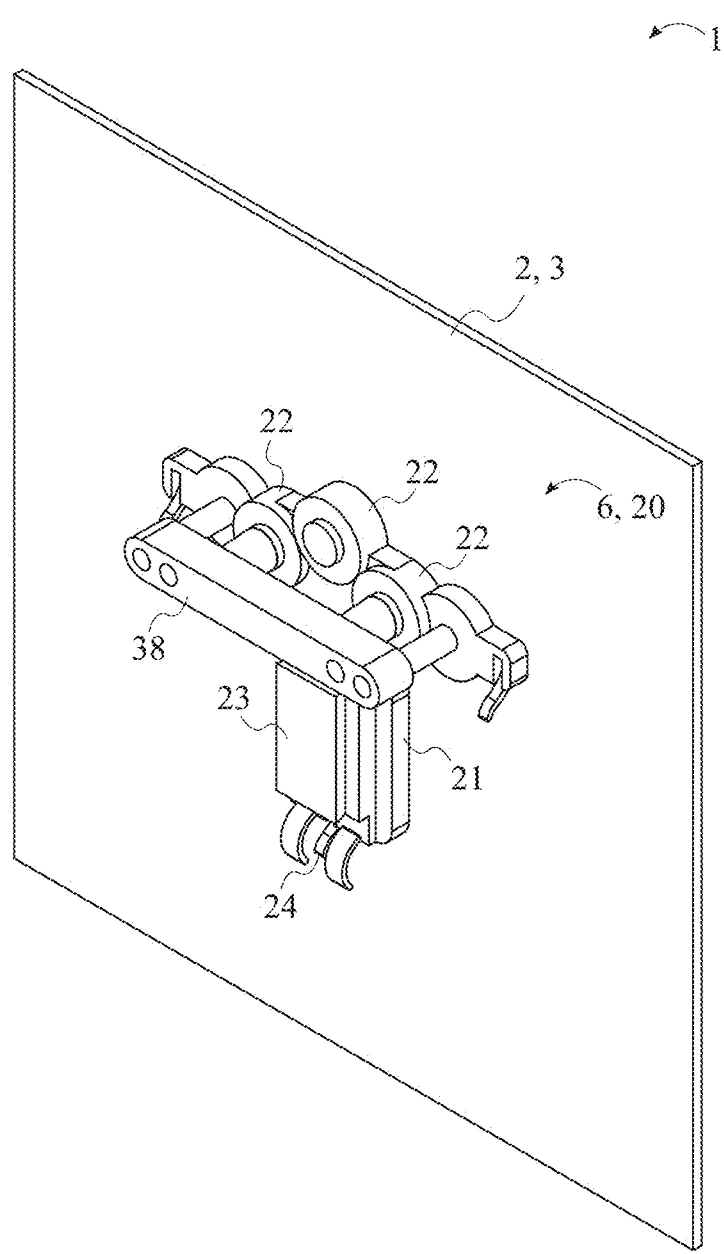
FIG. 2 is a top-front-left perspective view of the present invention thereof.
Figure 3:
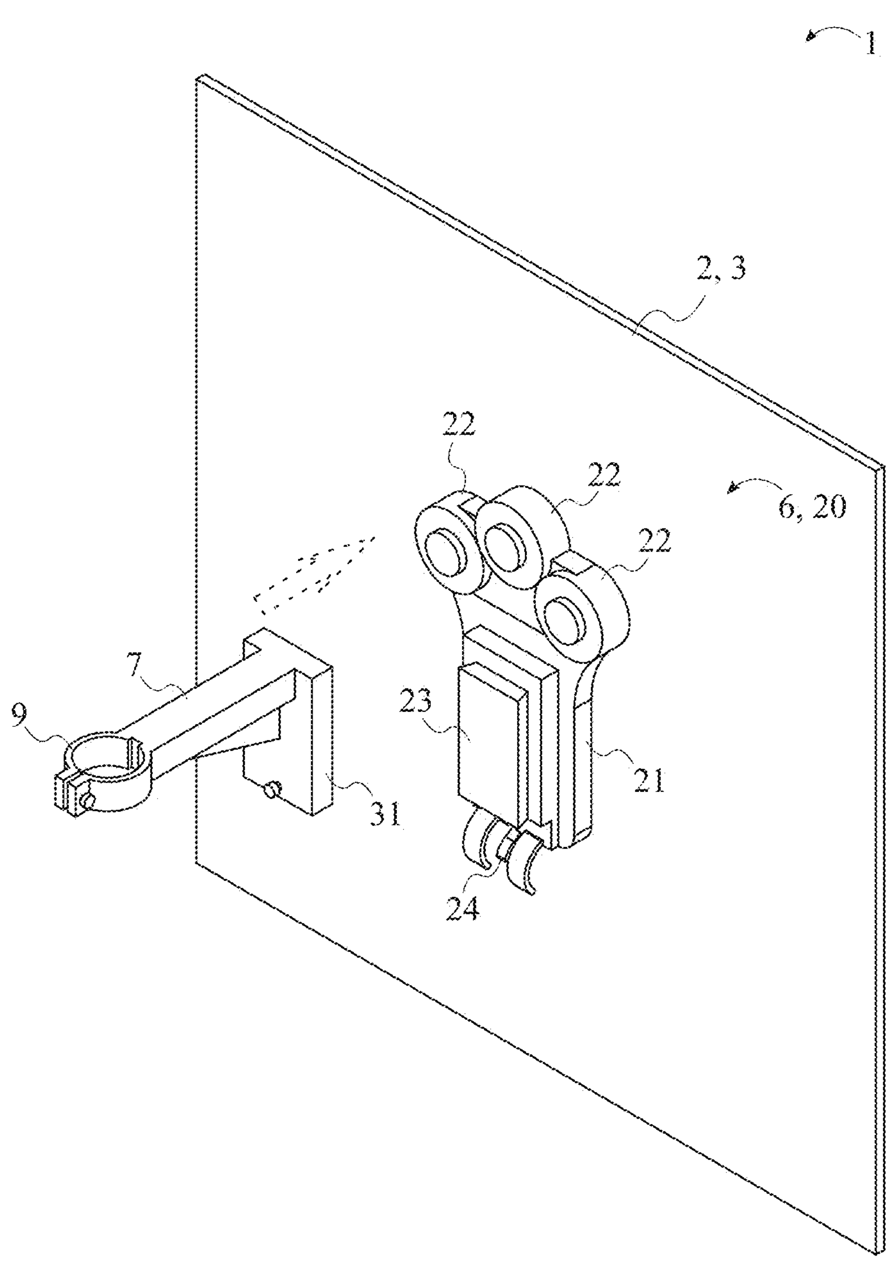
FIG. 3 is a top-front-left exploded perspective view of the present invention, wherein a mount body is shown attached to the first magnetic embodiment of the support-attachment mechanism.
Figure 4:
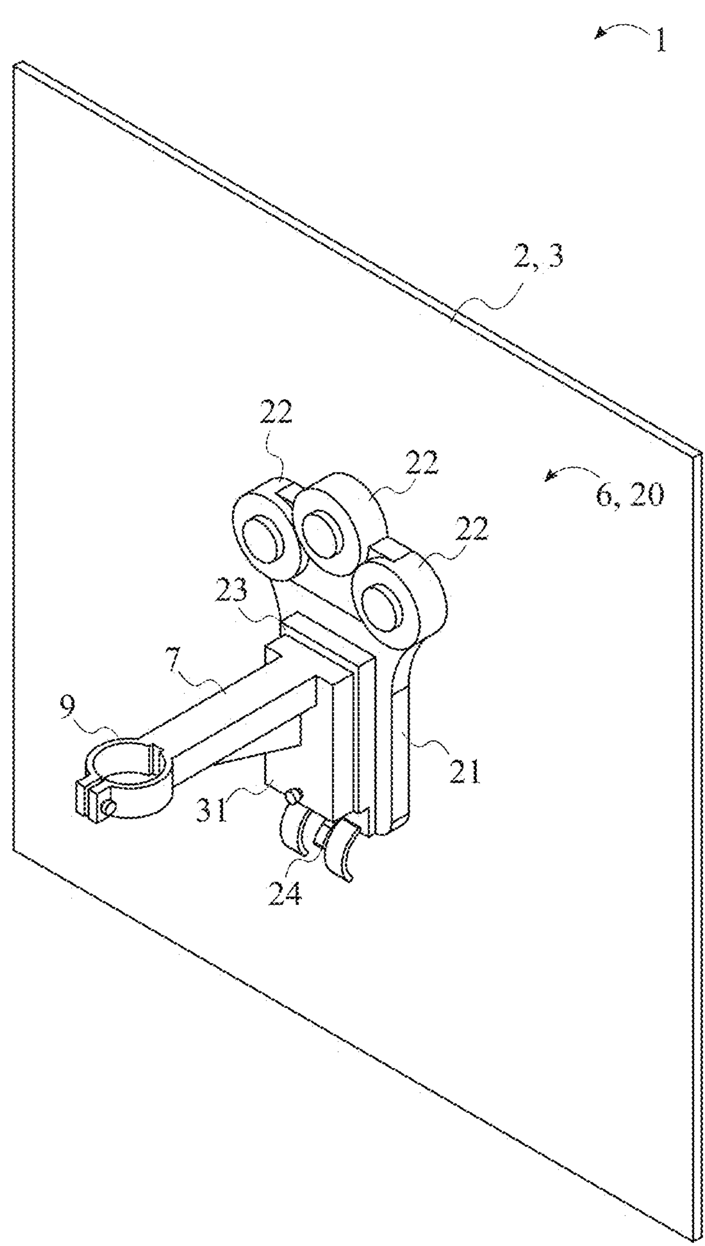
FIG. 4 is a top-front-left perspective view of the present invention thereof.
Figure 5:
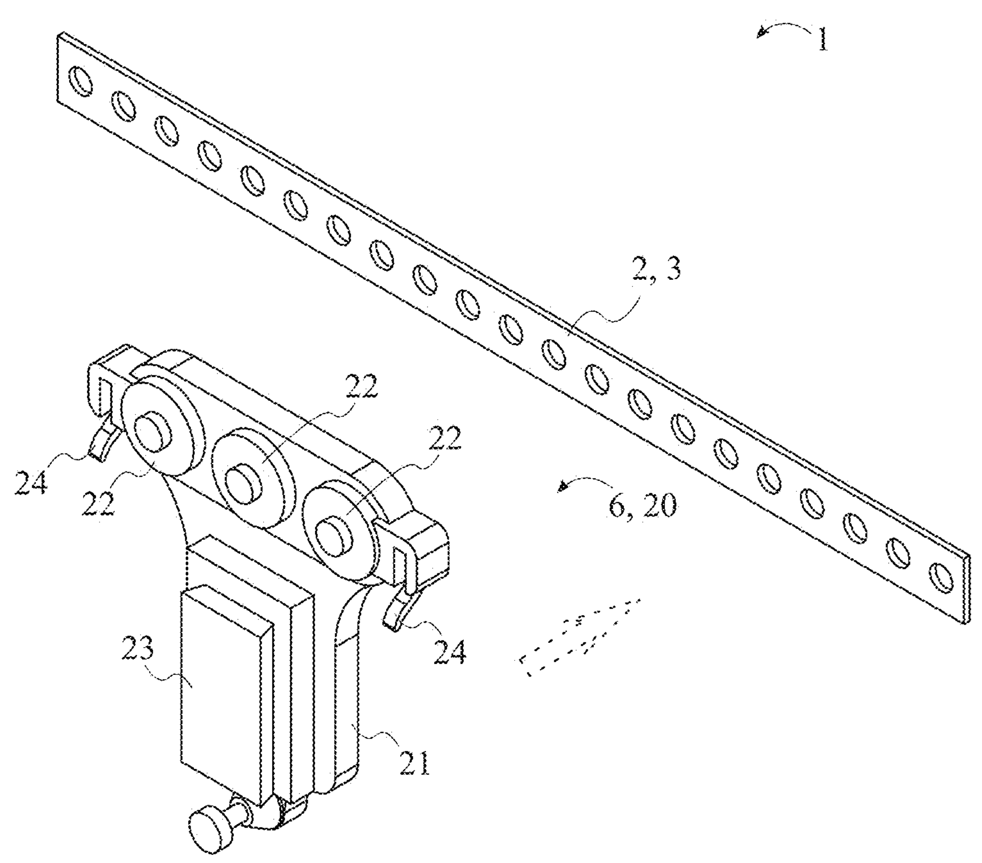
FIG. 5 is a top-front-left exploded perspective view of the present invention, wherein a second magnetic embodiment of the support-attachment mechanism is shown used for another metal base embodiment of the specific elongated support.
Figure 6:
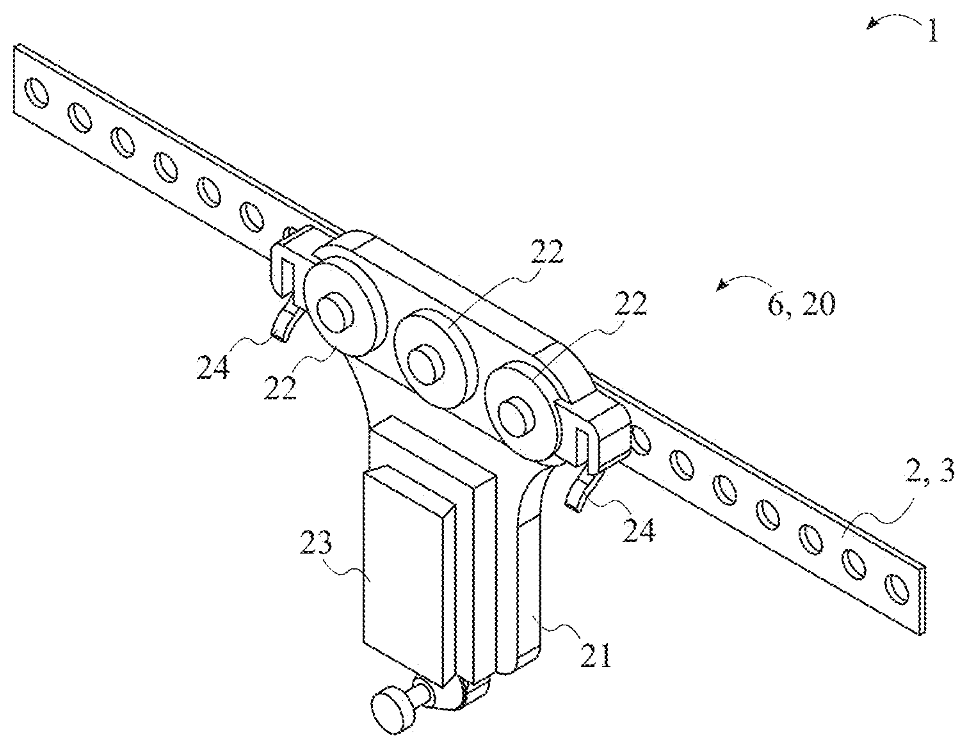
FIG. 6 is a top-front-left perspective view of the present invention thereof.
Figure 7:
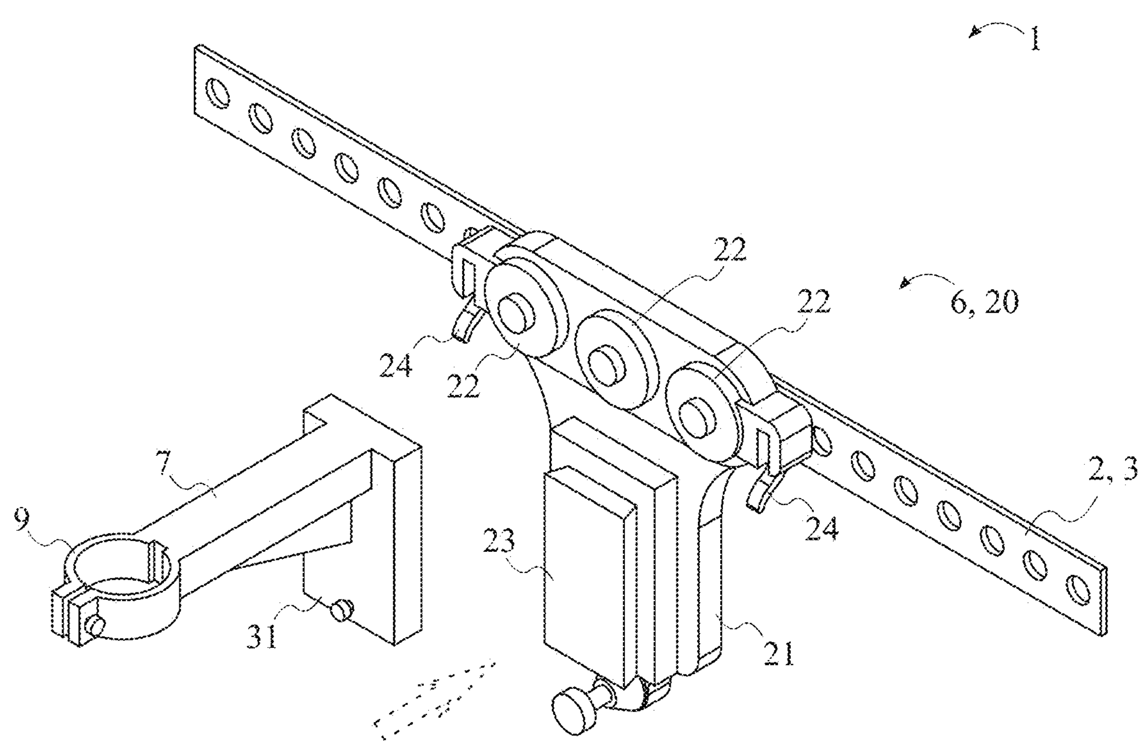
FIG. 7 is a top-front-left exploded perspective view of the present invention, wherein the mount body is shown attached to the second magnetic embodiment of the support-attachment mechanism.
Figure 8:
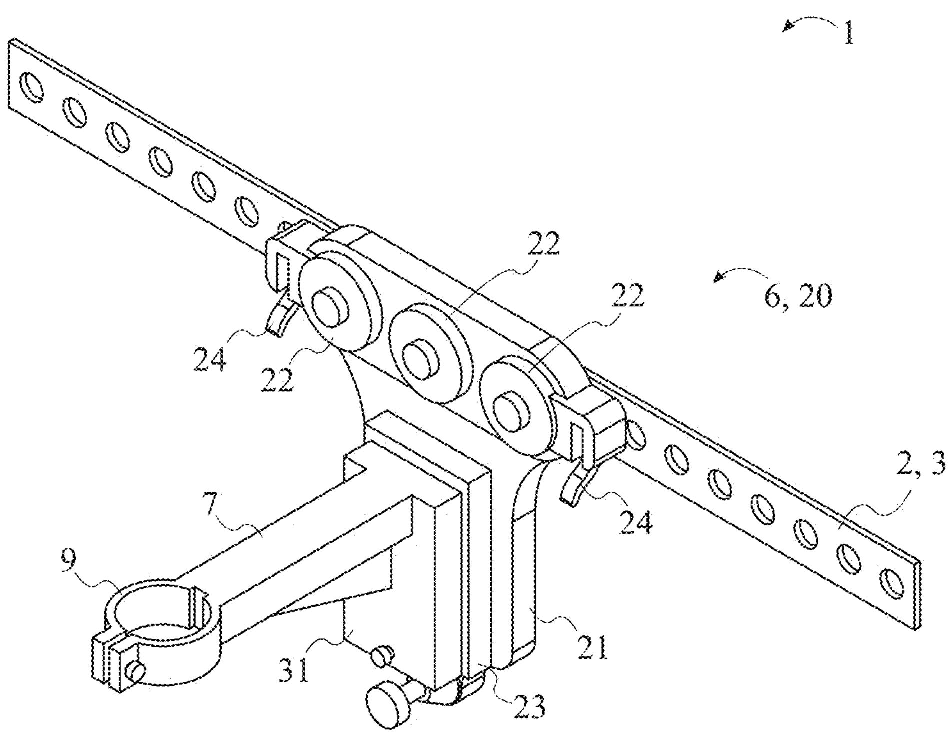
FIG. 8 is a top-front-left perspective view of the present invention thereof.
Figure 9:
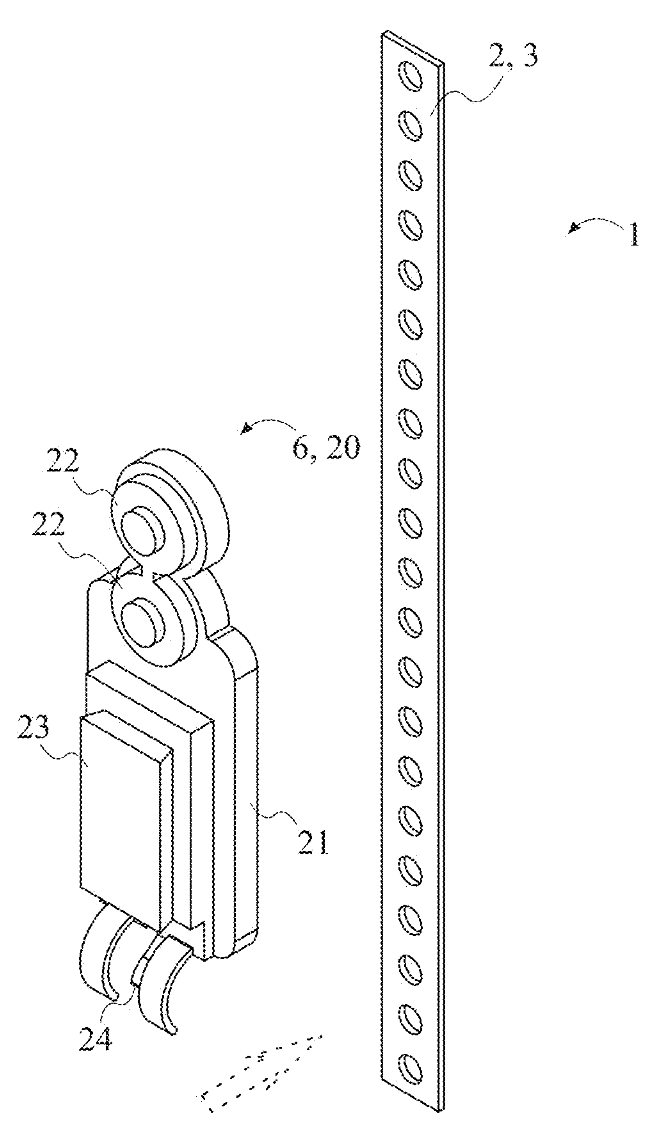
FIG. 9 is a top-front-left exploded perspective view of the present invention, wherein a third magnetic embodiment of the support-attachment mechanism is shown used for another metal base embodiment of the specific elongated support.
Figure 10:
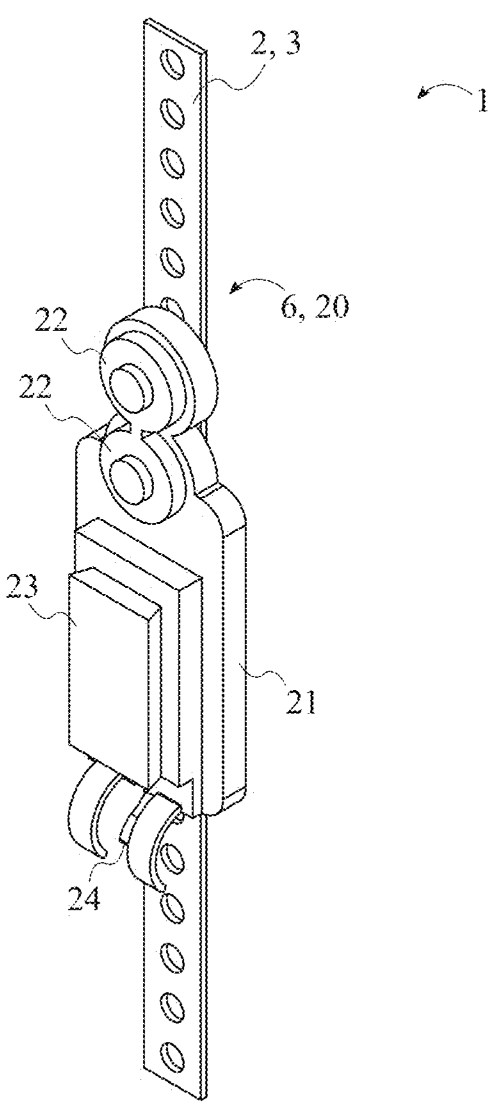
FIG. 10 is a top-front-left perspective view of the present invention thereof.
Figure 11:
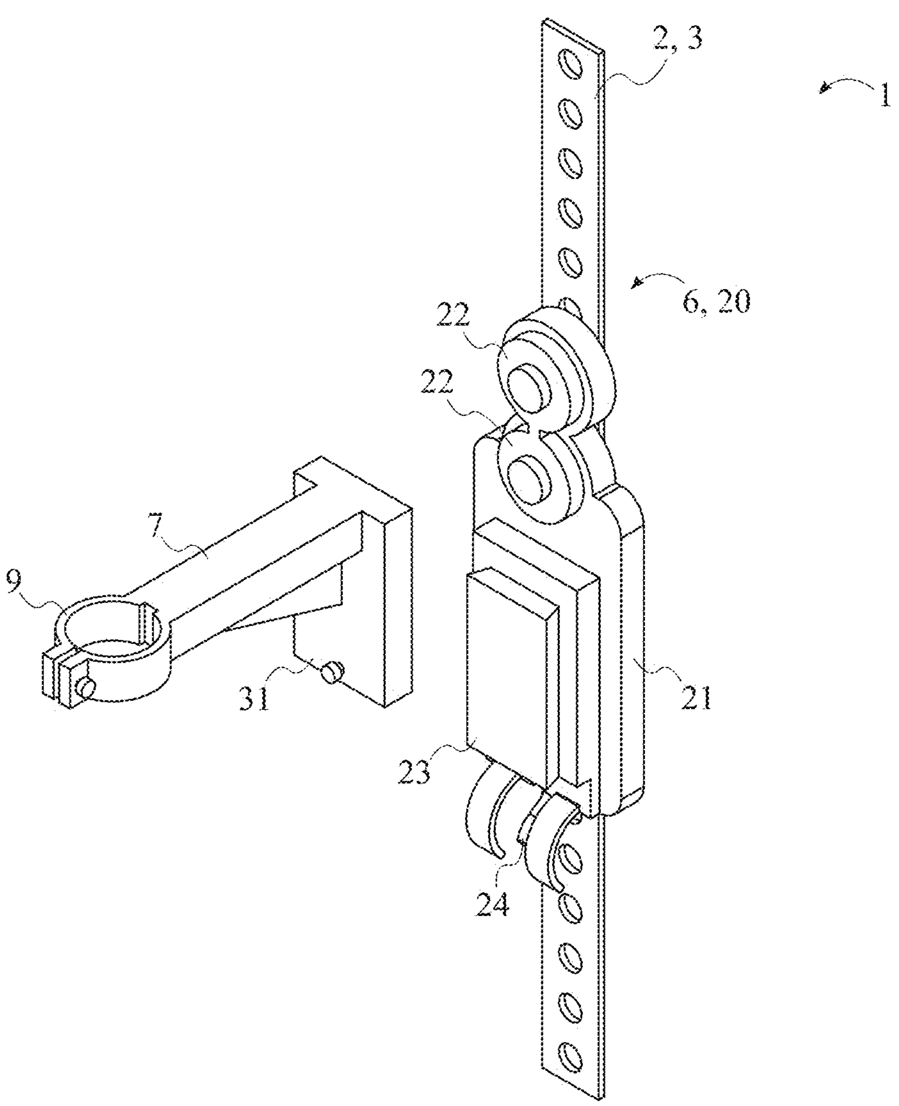
FIG. 11 is a top-front-left exploded perspective view of the present invention, wherein the mount body is shown attached to the third magnetic embodiment of the support-attachment mechanism.
Figure 12:
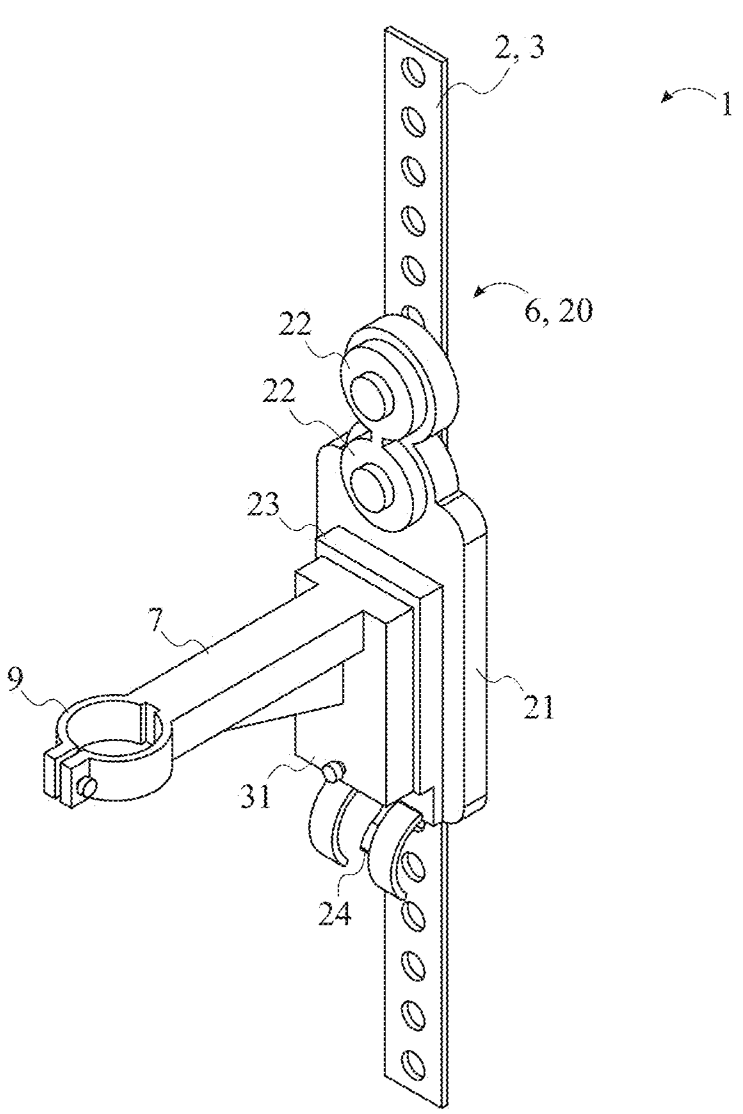
FIG. 12 is a top-front-left perspective view of the present invention thereof.
Figure 13:
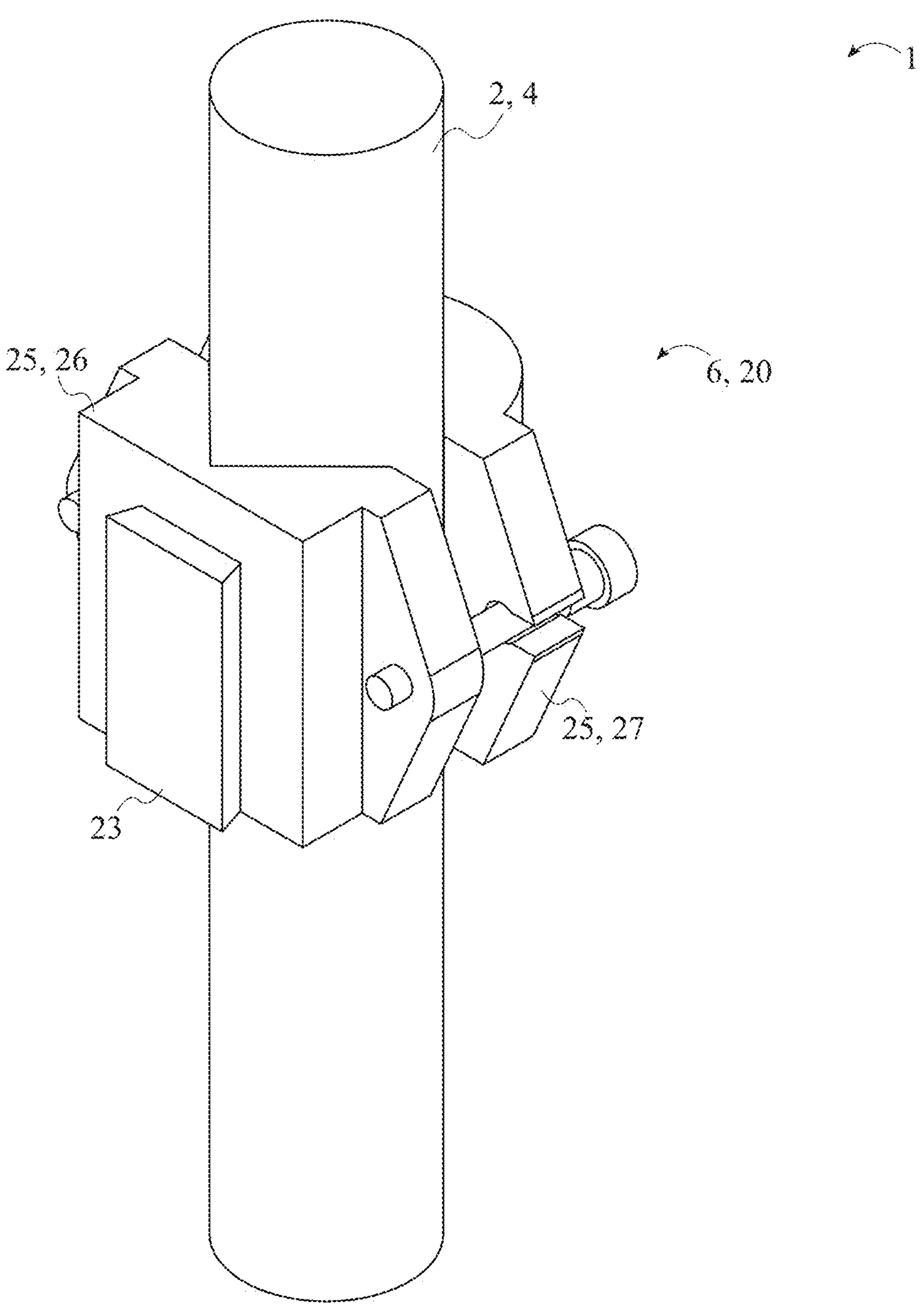
FIG. 13 is a top-front-left exploded perspective view of the present invention, wherein a clamp embodiment of the support-attachment mechanism is shown used for a telescopic pole of the specific elongated support.
Figure 14:
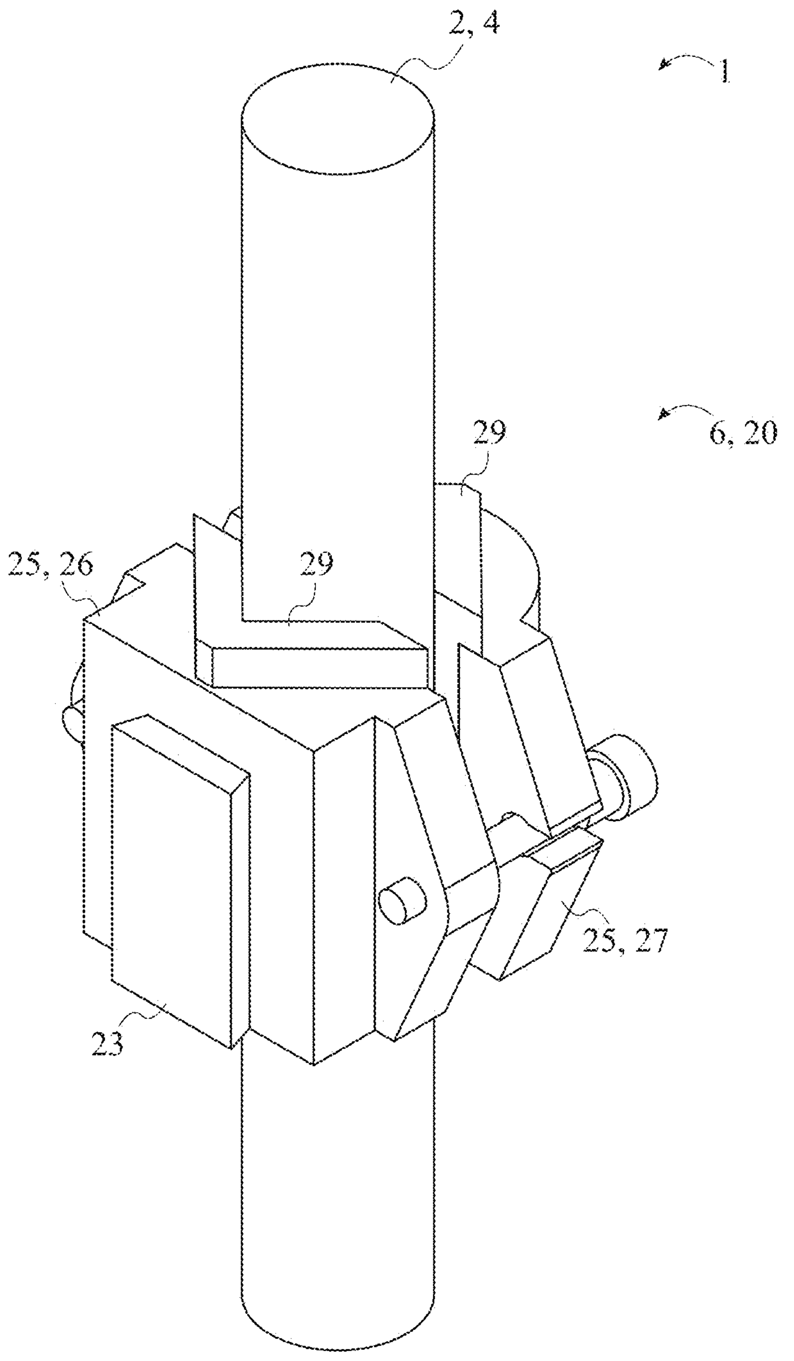
FIG. 14 is a top-front-left perspective view of the present invention thereof, wherein at least one support-attachment spacer is shown to accommodate a diametrically smaller telescopic pole of the specific elongated support.
Figure 15:
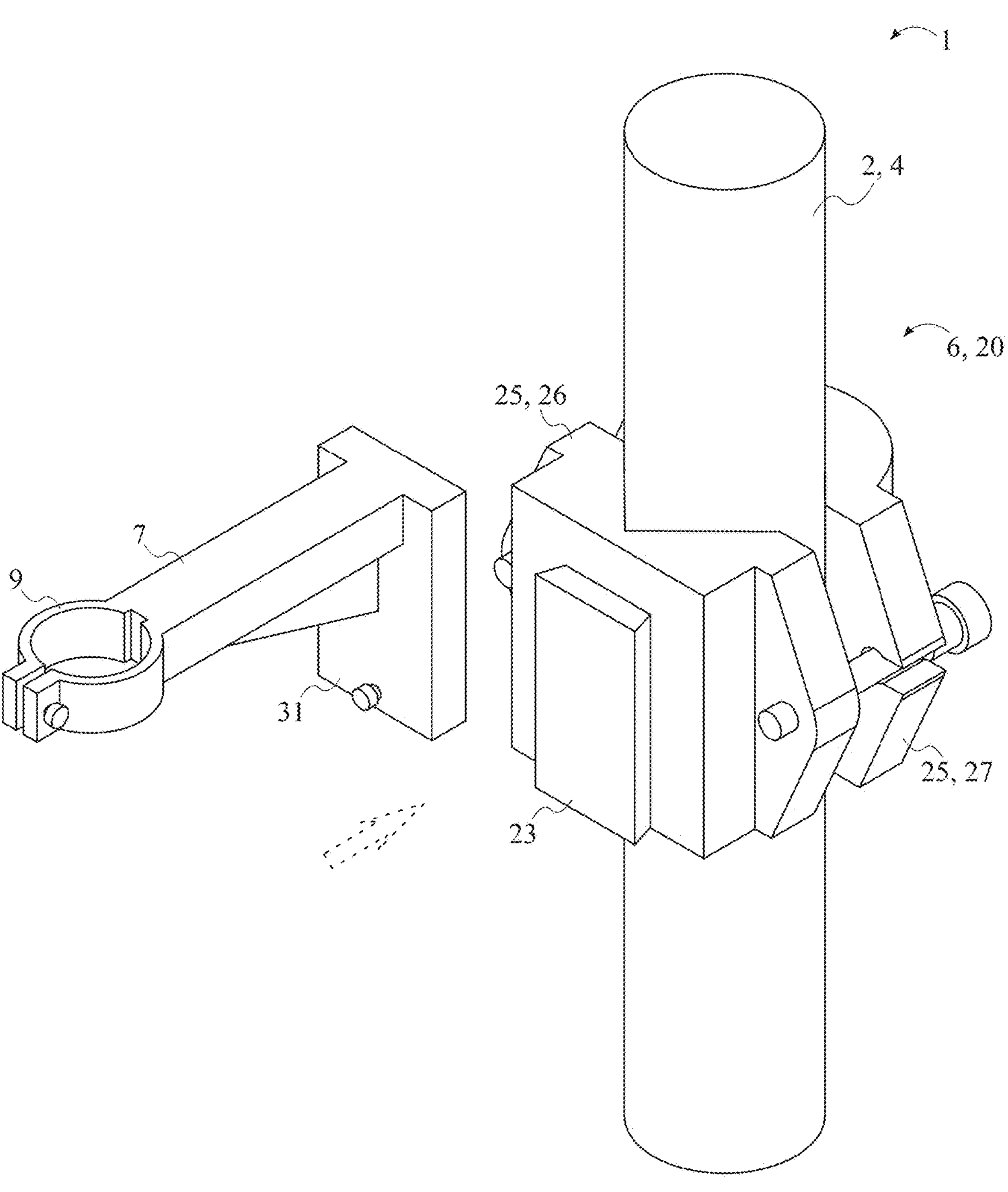
FIG. 15 is a top-front-left exploded perspective view of the present invention, wherein the mount body is shown attached to the clamp embodiment of the support-attachment mechanism.
Figure 16:
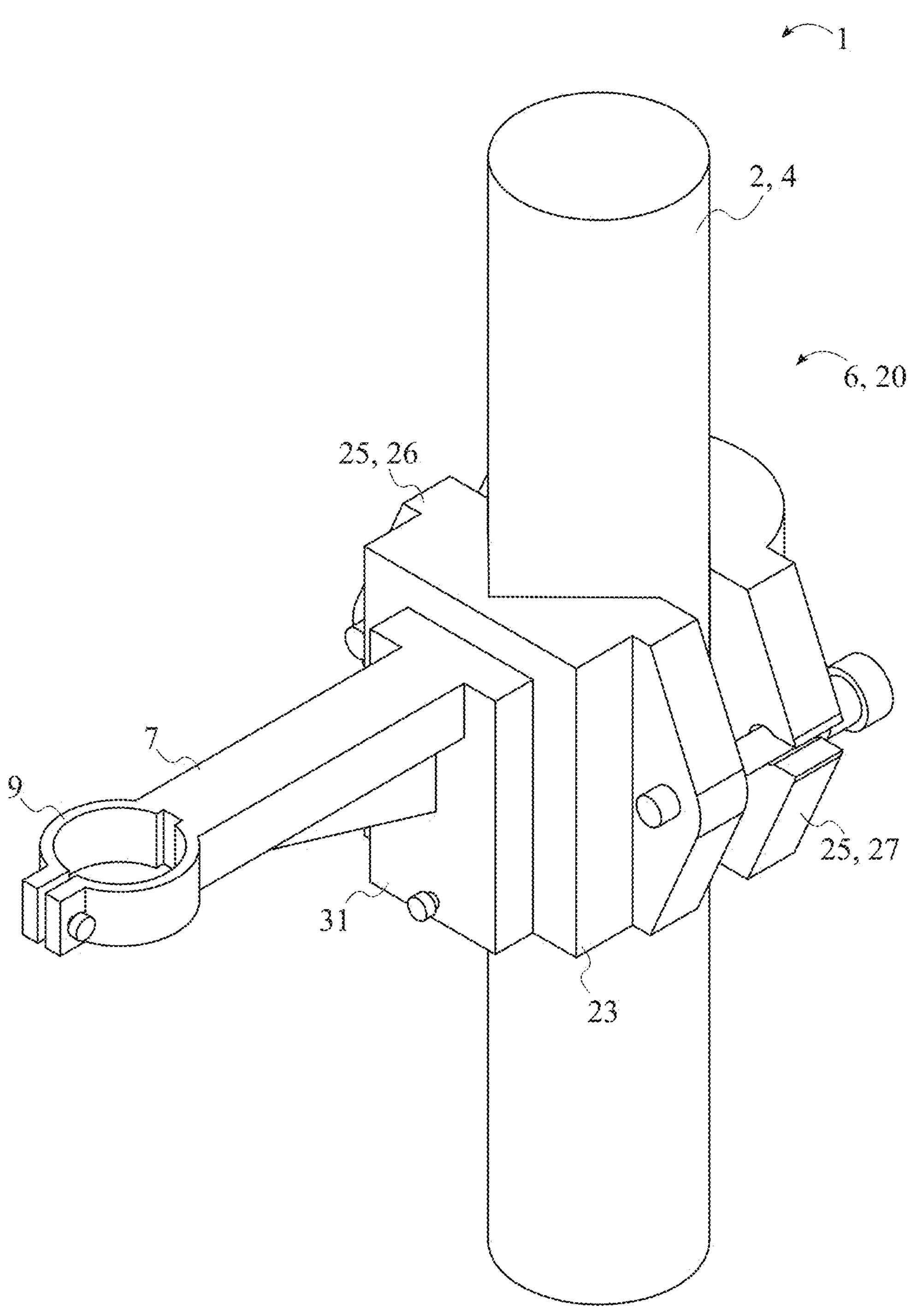
FIG. 16 is a top-front-left perspective view of the present invention thereof.
Figure 17:
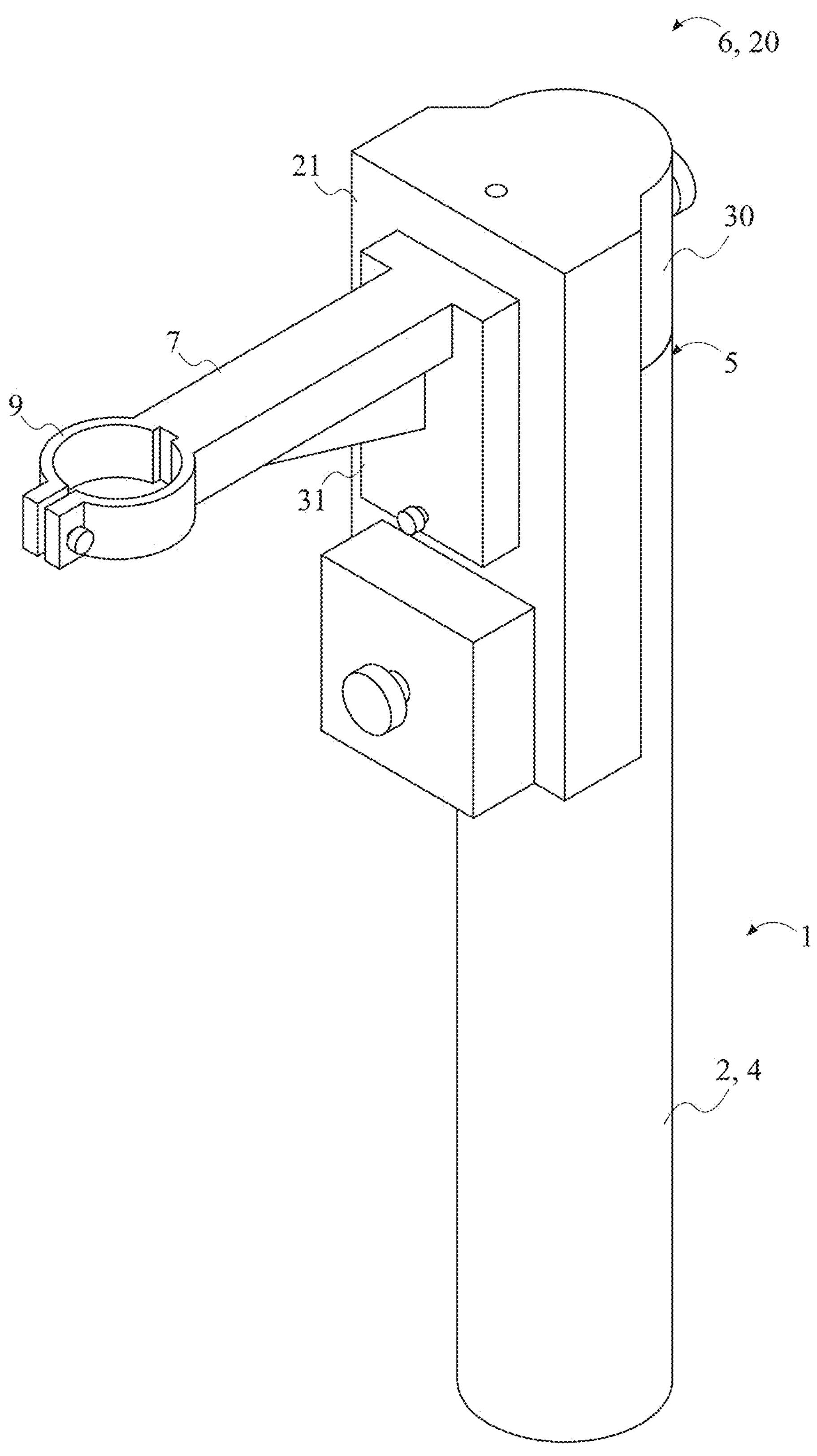
FIG. 17 is a top-front-left exploded perspective view of the present invention, wherein a first socket embodiment of the support-attachment mechanism is shown used for a telescopic pole of the specific elongated support.
Figure 18:
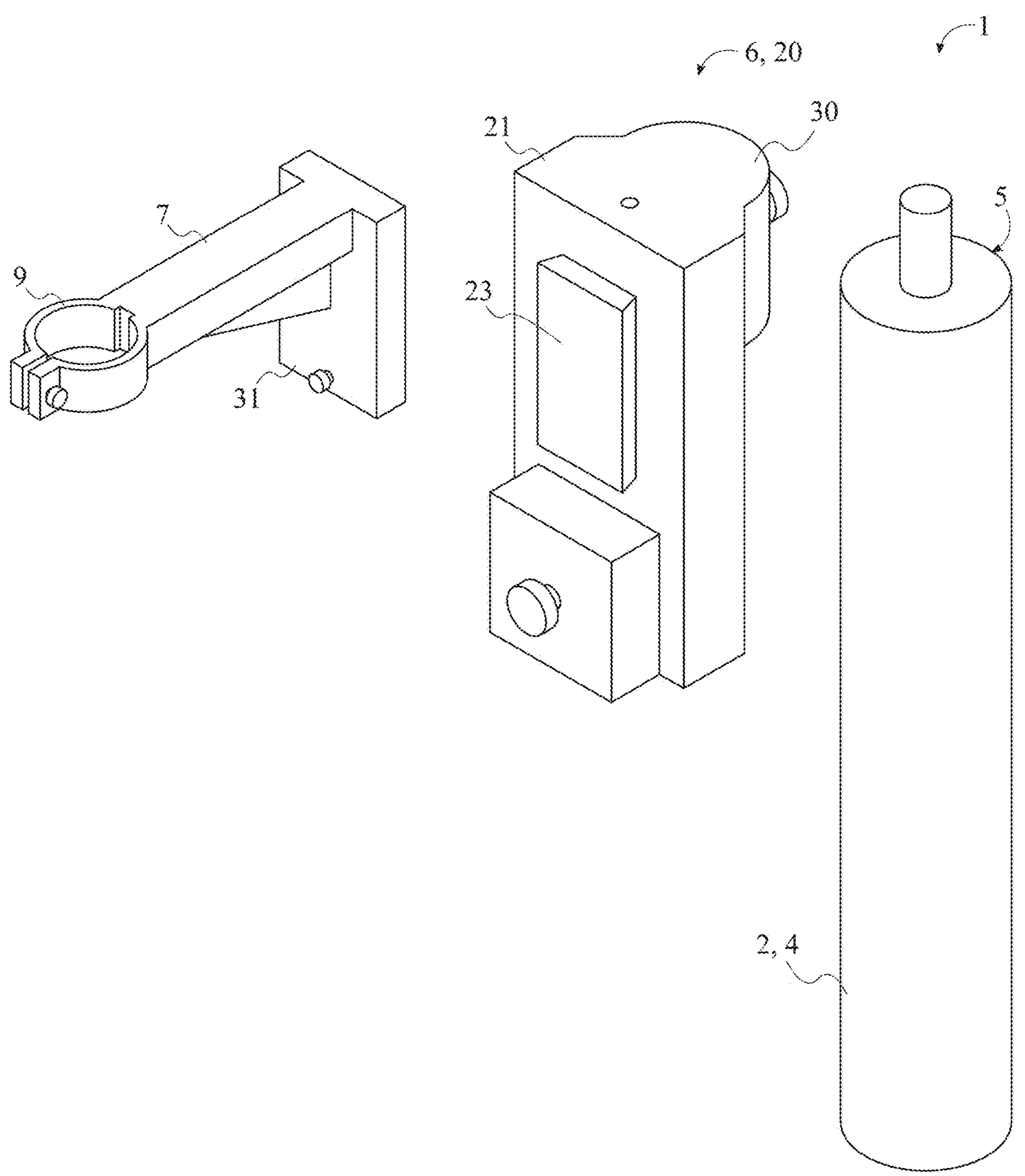
FIG. 18 is a top-front-left exploded perspective view of the present invention thereof.
Figure 19:
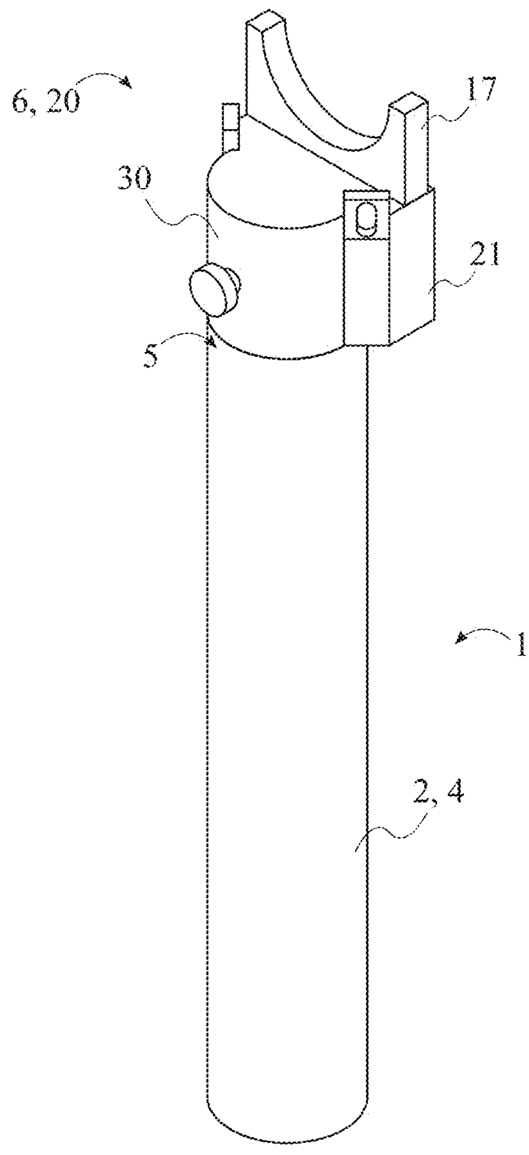
FIG. 19 is a top-front-left exploded perspective view of the present invention, wherein a second socket embodiment of the support-attachment mechanism is shown used for a telescopic pole of the specific elongated support.
Figure 20:
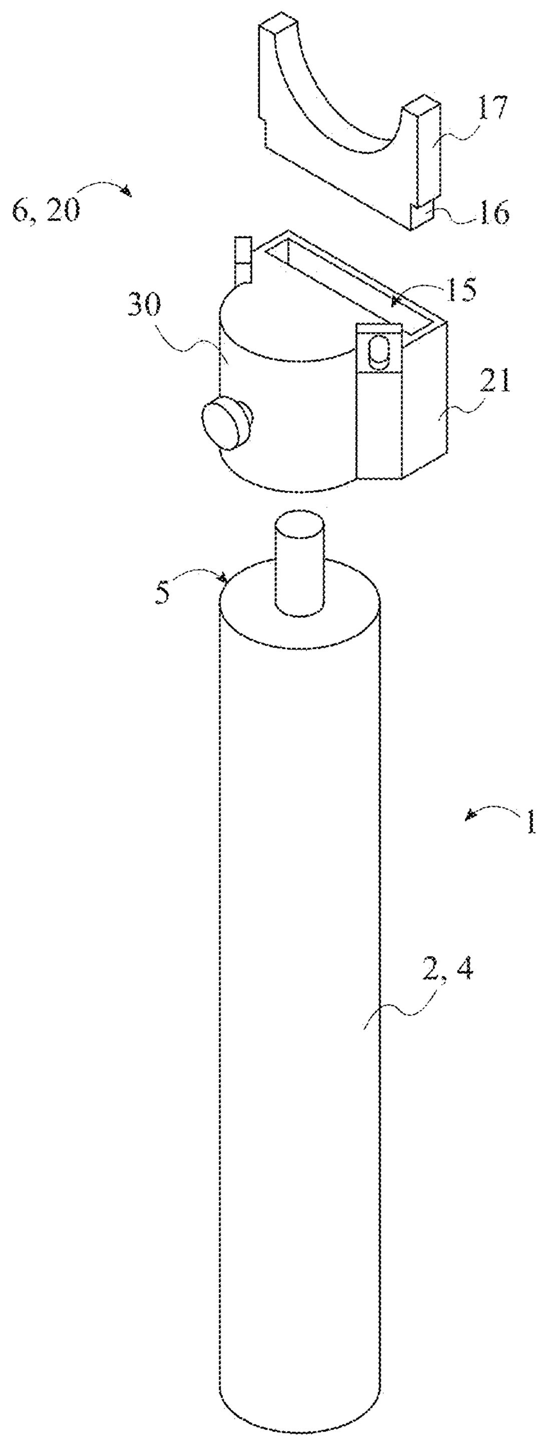
FIG. 20 is a top-front-left exploded perspective view of the present invention thereof.
Figure 21:
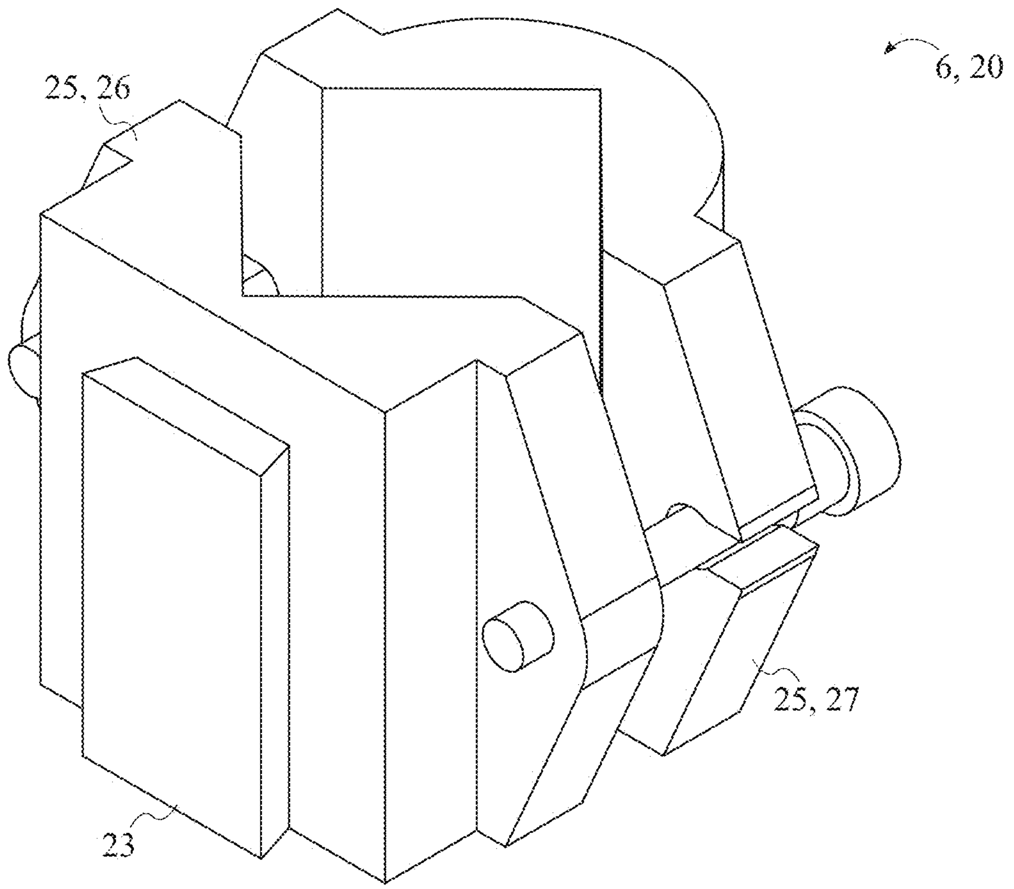
FIG. 21 is a top-front-left perspective view of the clamp embodiment of the support-attachment mechanism of the present invention.

In some embodiments, the magnetic version of the support-attachment mechanism 20 may need additional support to further secure the support-attachment mechanism 20 to the at least one metal base 3. As can be seen in FIGS. 1 and 2, the present invention may further comprise a plurality of magnetic hold bars. The plurality of magnetic hold bars 38 is designed to provide more holding power to the magnetic versions of the support-attachment mechanism 20 for heavier backdrops or photography accessories. In addition, the plurality of magnetic hold bars 38 can accommodate smaller photography accessories, such as small lights, while providing additional holding power to the support-attachment mechanism 20. In general, each of the plurality of magnetic hold bars 38 comprises a central bar, a first terminal magnet, a second terminal magnet, and a plurality of receiving holes. The central bar is bar long enough to span the plurality of support-attachment magnets 22 and a has size large enough to accommodate the plurality of receiving holes. The plurality of receiving holes is distributed along the central bar to receive an adapter such as a standard light stand spigot that allows the mounting of the light or desired photography accessory to the central bar. Further, the first terminal magnet and the second terminal magnet are each terminally connected to the opposite terminal ends of the central bar. This way, when the central bar is positioned over the plurality of support-attachment magnets 22 and engages some of the support-attachment magnets 22, the first terminal magnet and the second terminal magnet are positioned at opposite ends of the plurality of support-attachment magnets 22. As a result, the specific magnetic hold bar 38 embraces the plurality of support-attachment magnets 22 of the specific magnetic support-attachment mechanism 20 to provide additional holding power. Furthermore, each terminal magnet can be equipped with a release lever 24 to help remove the specific magnetic hold bar from the at least one metal base 3.

Figure 49:
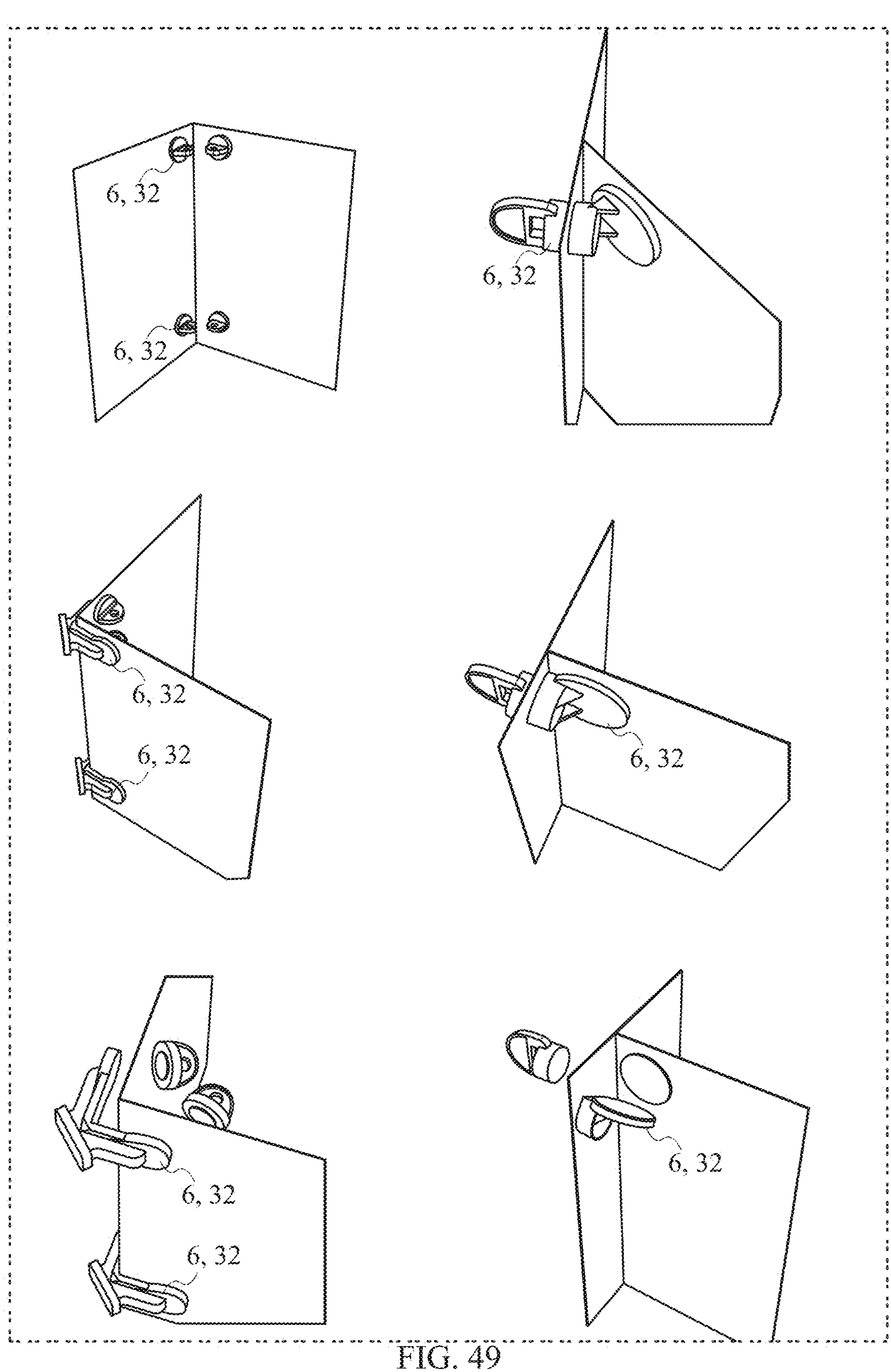
FIG. 49 is a schematic view of the present invention, wherein an alternate embodiment of the specific accessory mount of the plurality of accessory mounts is shown.

In some embodiments, the magnetic versions of the support-attachment mechanism 20 can include versions that accommodate photography backdrops that do not hang straight, such as paper canvas or cloth backdrops. As can be seen in FIG. 49, in this embodiment, the support-attachment mechanism 20 comprises a first magnetic base and a second magnetic base corresponding to two magnetic bases that can be magnetically coupled to each other to embrace a portion of the selected backdrop. The first magnetic base is preferably a base equipped with a hinged handle that presses the corresponding section of the backdrop against the second magnetic base. The second magnetic base corresponds to the magnetic base that can be attached to the at least one metal base 3 or to another backdrop. The second magnetic base can include different designs that allow the setup of the desired backdrops on the corner of a room. In one embodiment, the second magnetic base can be an edge-to-edge base with an L-shaped design that accommodates two units of the first magnetic base. The edge-to-edge base version allows two backdrops to be arranged perpendicular to each other while the second magnetic base is attached to the at least one metal base 3. In another embodiment, the second magnetic base allows the attachment of a first backdrop to a second backdrop without direct support from the at least one metal base 3. The second magnetic base can be attached to the second backdrop using a fastener, such as a hook-and-loop fastener. The second magnetic base can also be designed to orient the second backdrop perpendicular to the first backdrop or at an angle. In other embodiments, different support-attachment mechanisms 20 can be implemented to support specific backdrops directly to an elongated support or to another object using other connection mechanisms.

As previously discussed, different existing support devices can serve as elongated supports of the plurality of elongated supports 1 to form the desired support assembly. As can be seen in FIGS. 13 through 20 and 41 through 48, in some embodiments, the specific elongated support 2 is at least one telescopic pole 4 that can be fastened to an existing wall or other supportive surface. The at least one telescopic pole 4 can be a self-standing telescopic pole, such as a speaker/light stand, or a telescopic pole that can be secured to an existing structure, such as a floor-to-ceiling pole. Like the at least one metal base 3, a single telescopic pole can be used to support a single backdrop, or several telescopic poles can be used to support several backdrops in different orientations relative to each other. In addition, a combination of telescopic poles 4 and metal bases 3 can be utilized to support several photography backdrops and/or accessories such as lights.

Further, to accommodate the at least one telescopic pole 4, the support-attachment mechanism 20 is designed as a clamp structure that engages the tubular bodies of the at least one telescopic pole 4. As can be seen in FIGS. 13 through 25, the support-attachment mechanism 20 of the specific accessory mount 32 may comprise a support-attachment clamp 25 and a support-attachment adapter 23. The support-attachment clamp 25 corresponds to the clamp mechanism that engages a tubular body of the at least one telescopic pole 4. The support-attachment adapter 23 is designed to receive the mount body 7 of the desired accessory mount of the plurality of accessory mounts 6. Like the magnetic version of the support-attachment mechanism 20, the support-attachment adapter 23 is preferably the pin portion of a dovetail joint that receives the socket portion of the dovetail joint integrated into the mount body 7. This way, the mount body 7 of different accessory mounts of the plurality of accessory mounts 6 can be attached to the same support-attachment base 21 of a support-attachment mechanism 20.

In the preferred embodiment, the clamp version of the support-attachment mechanism 20 can be arranged as follows: the support-attachment clamp 25 comprises a proximal clamping jaw 26 and a distal clamping jaw 27 corresponding to two jaws that embrace a tubular body of the at least one telescopic pole 4. As can be seen in FIGS. 13 through 25, the proximal clamping jaw 26 is laterally pressed against the at least one telescopic pole 4 and the distal clamping jaw 27 is also laterally pressed against the at least one telescopic pole 4, opposite to the proximal clamping jaw 26. This way, the proximal clamping jaw 26 and the distal clamping jaw 27 embrace a tubular body of the at least one telescopic pole 4. The distal clamping jaw 27 is pivotally connected to the proximal clamping jaw 26 using a pivot knob that traverses an elongated hole at one end of the distal clamping jaw 27 and threadably engages the adjacent end of the proximal clamping jaw 26. Further, a lock knob also traverses an open slot at the end of the distal clamping jaw 27 opposite to the elongated hole and threadably engages the adjacent end of the proximal clamping jaw 26.

When the lock knob and the pivot knob are loosened, the distal clamping jaw 27 can be laterally moved until the lock know clears the open slot of the distal clamping jaw 27, as can be seen in FIGS. 13 through 25. This allows the distal clamping jaw 27 to pivot about the distal clamping jaw 27 about the pivot knob so that the support-attachment clamp 25 can be attached to the desired tubular body of the at least one telescopic pole 4. Once the support-attachment clamp 25 is positioned at the desired location along the at least one telescopic pole 4, the user can pivot the distal clamping jaw 27 back to the original position, engage the lock knob with the open slot, and then tighten both the lock knob and the pivot knob to secure the support-attachment clamp 25 to the at least one telescopic pole 4. Further, the support-attachment adapter 23 is connected adjacent to the proximal clamping jaw 26, opposite to the at least one telescopic pole 4, to receive the mount body 7 of the specific accessory mount 32 of the plurality of accessory mounts 6. In other embodiments, the distal clamping jaw 27 may comprise a plurality of spigot orifices externally distributed about the distal clamping jaw 27 to receive light stand spigots so that different accessories, such as photography lights 34, can be directly mounted onto the support-attachment clamp 25.

Figure 22:
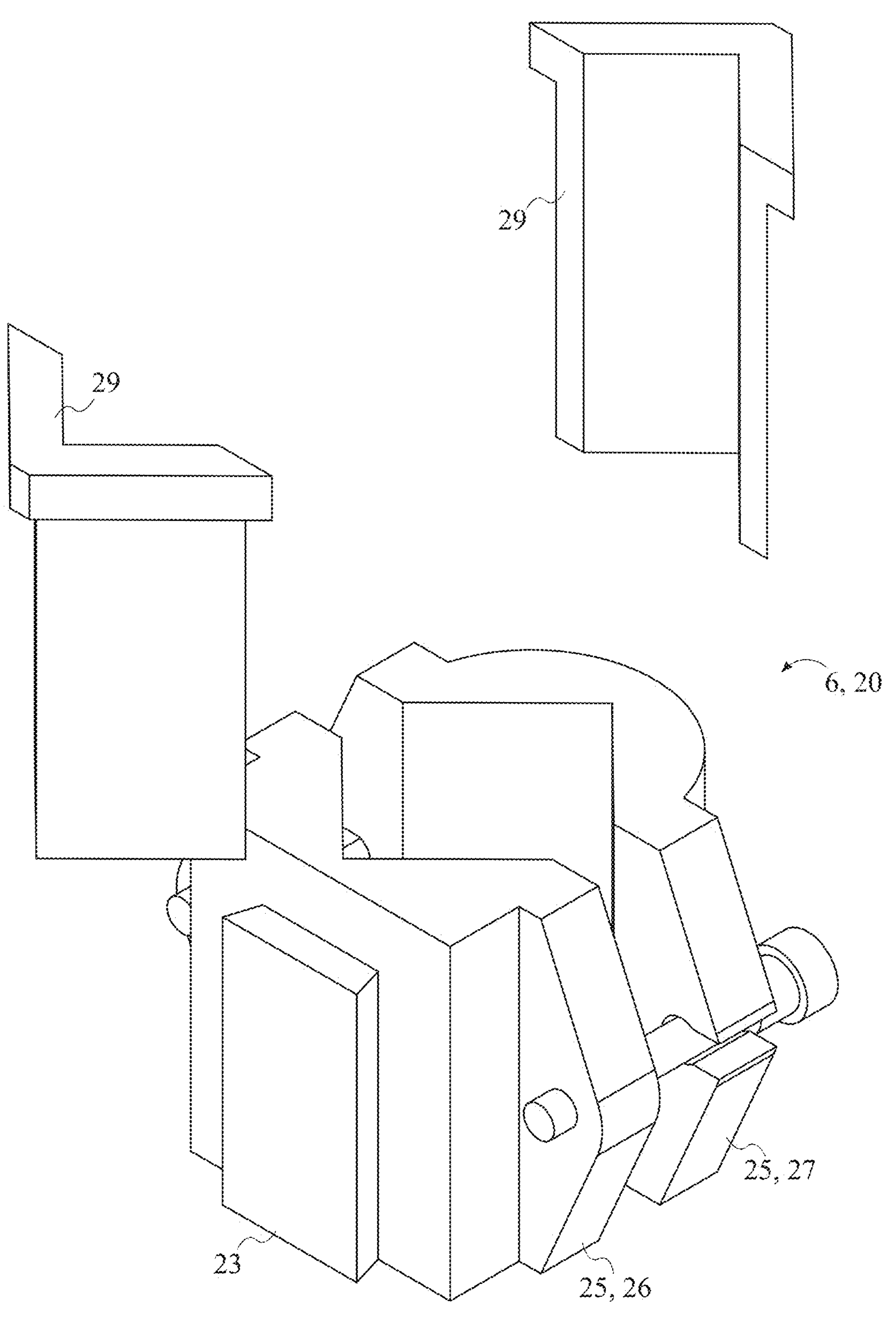
FIG. 22 is a top-front-left exploded perspective view of the present invention thereof, wherein at least one support-attachment spacer is shown to accommodate a diametrically smaller telescopic pole of the specific elongated support.
Figure 23:
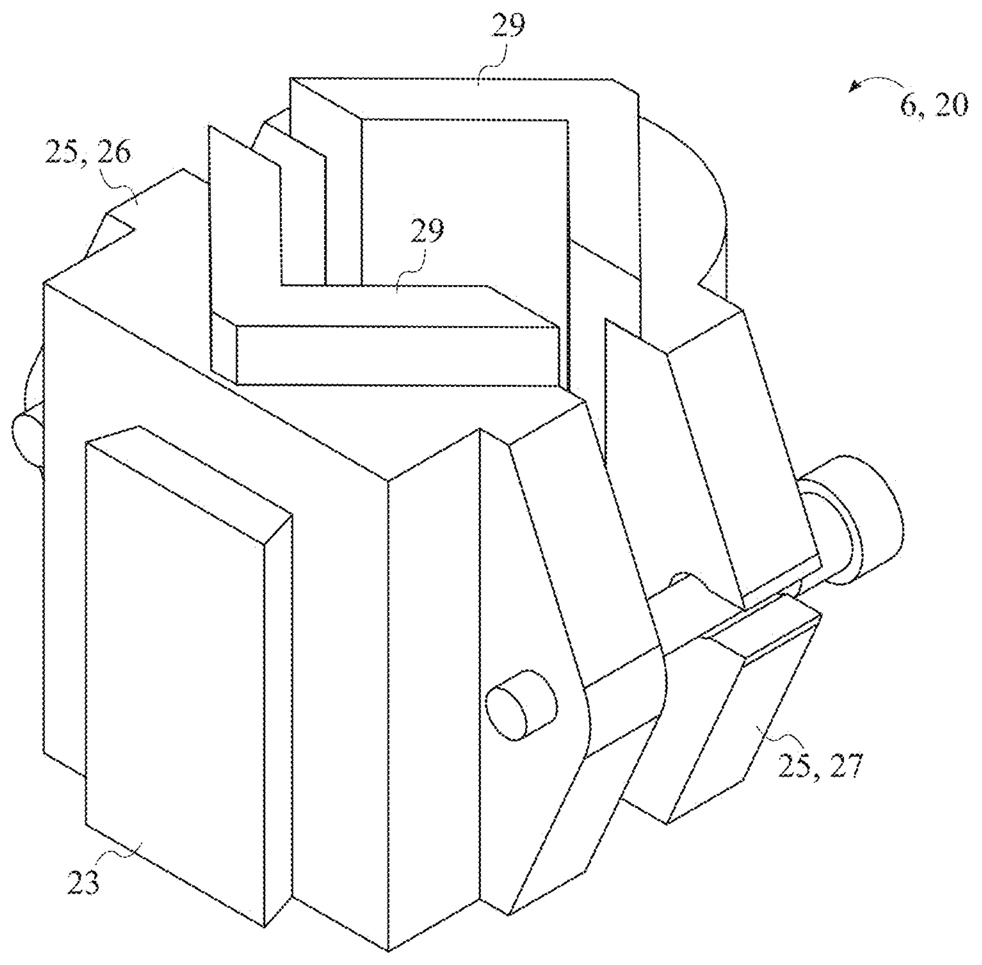
FIG. 23 is a top-front-left perspective view of the clamp embodiment of the support-attachment mechanism of the present invention thereof.
Figure 24:
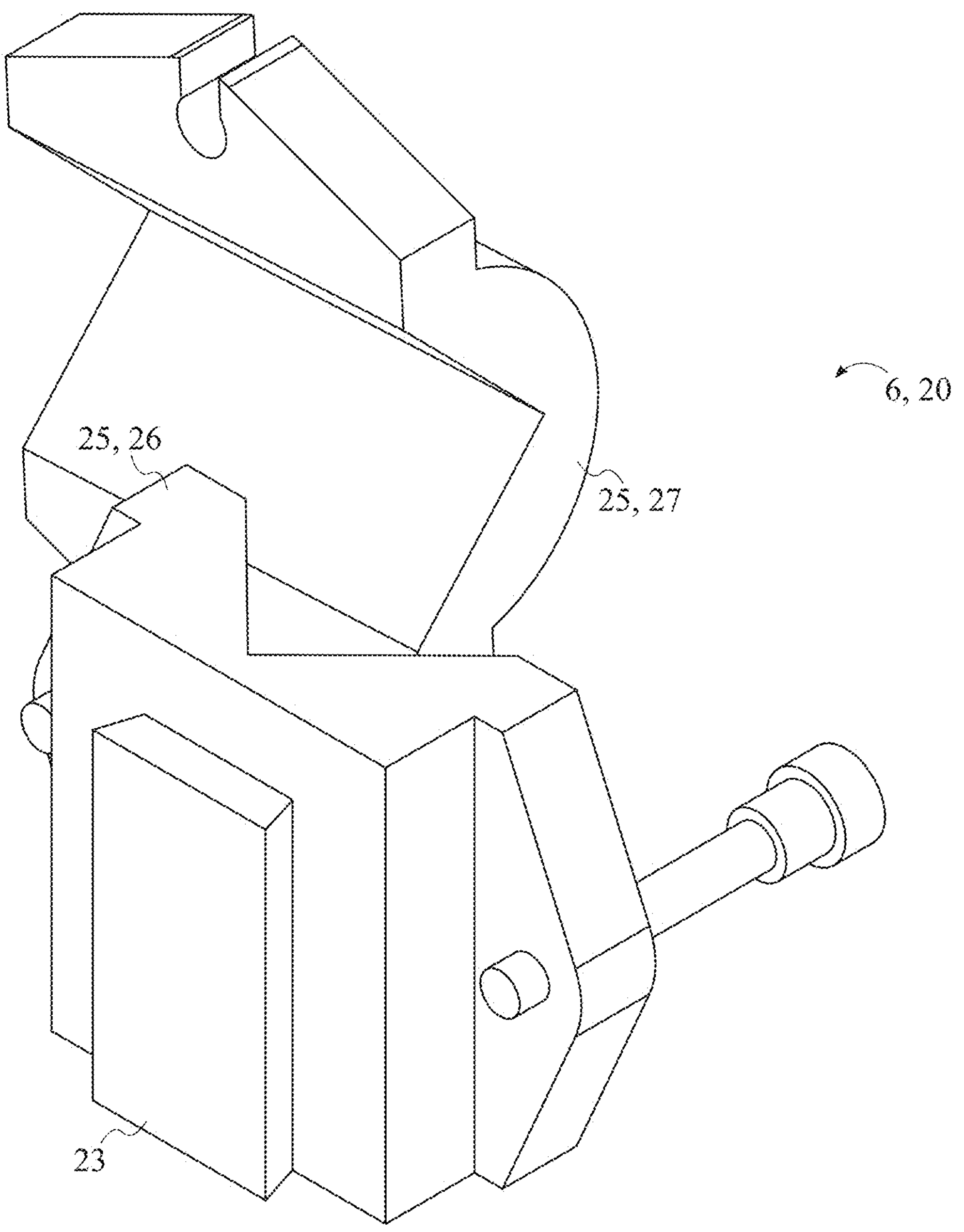
FIG. 24 is a top-front-left perspective view of the clamp embodiment of the support-attachment mechanism, wherein the distal clamping jaw is shown detached from the proximal clamping jaw.
Figure 25:
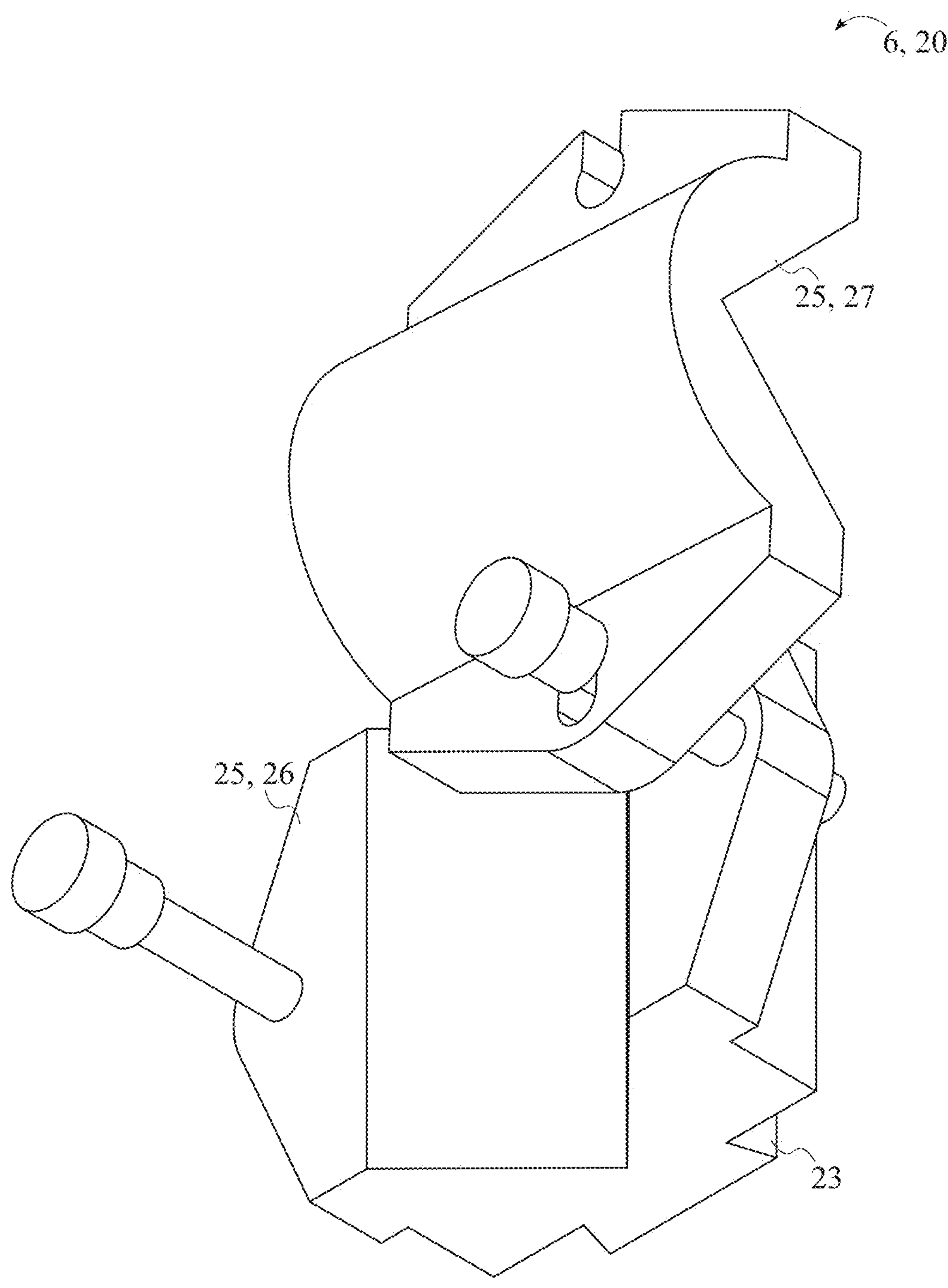
FIG. 25 is a bottom-rear-right perspective view of the clamp embodiment of the support-attachment mechanism thereof.
Figure 26:
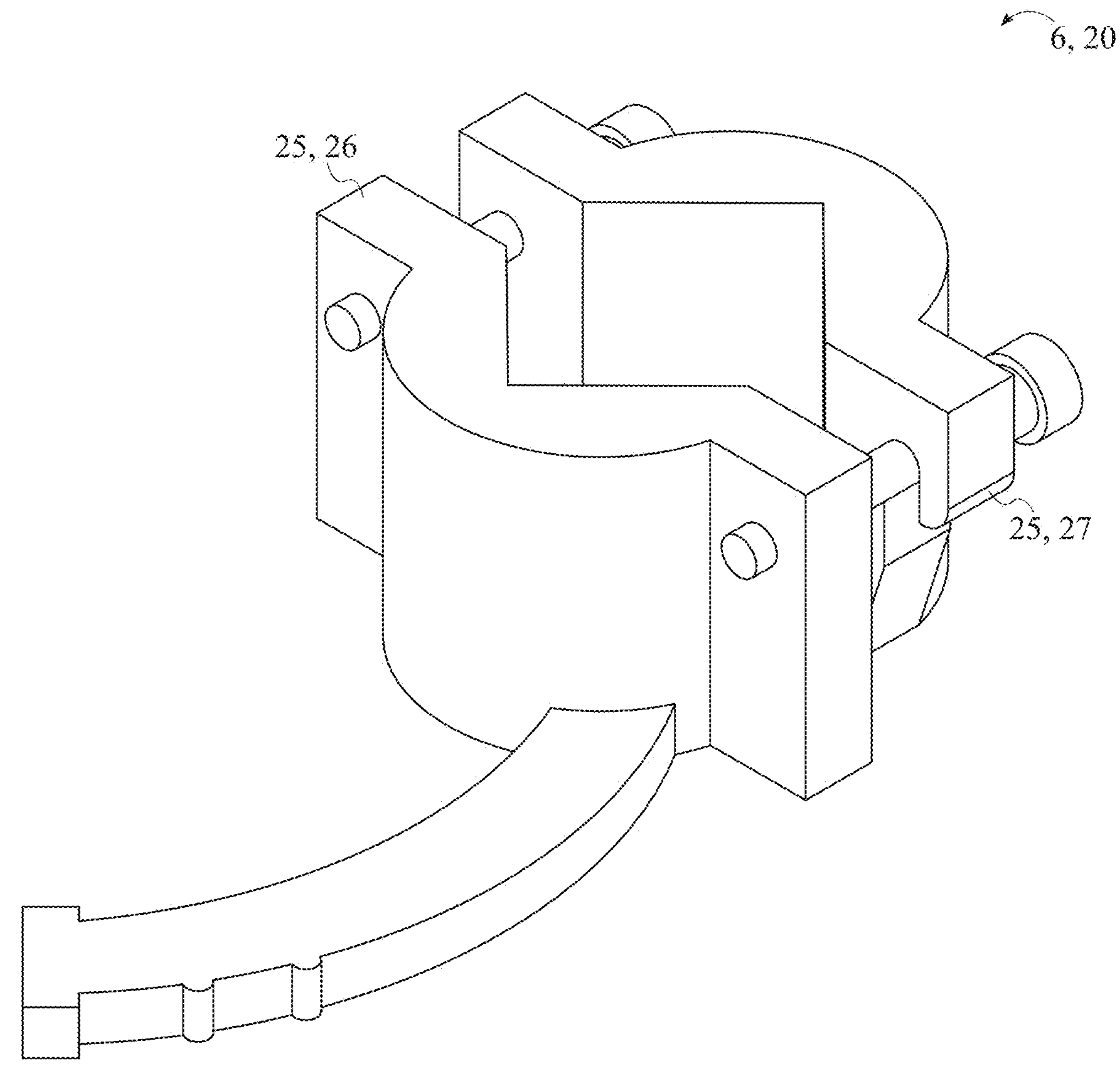
FIG. 26 is a top-front-left perspective view of a pole stretcher of the present invention.
Figure 27:
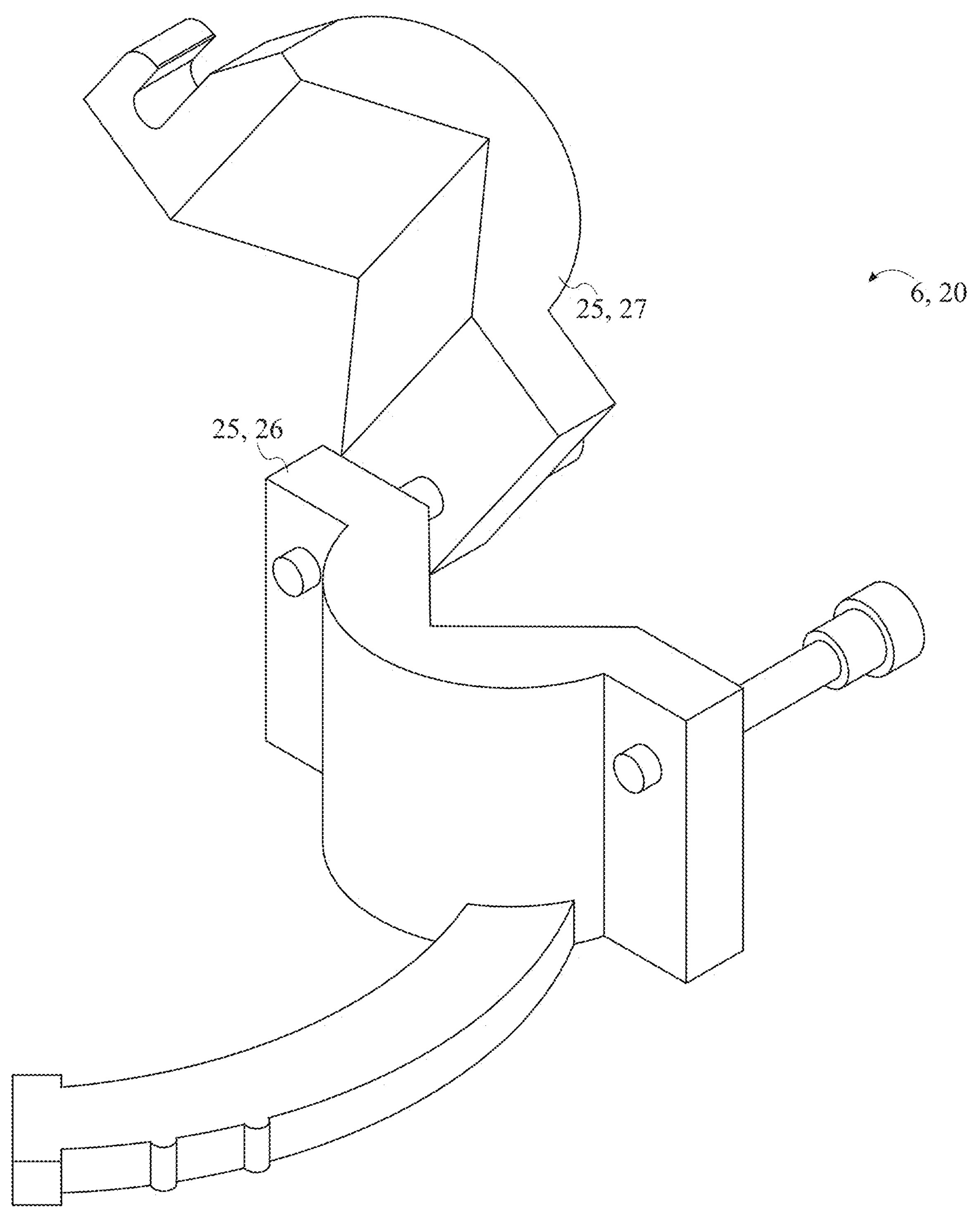
FIG. 27 is a top-front-left perspective view of the pole stretcher of the present invention, wherein the distal clamping jaw is shown detached from the proximal clamping jaw.
Figure 28:
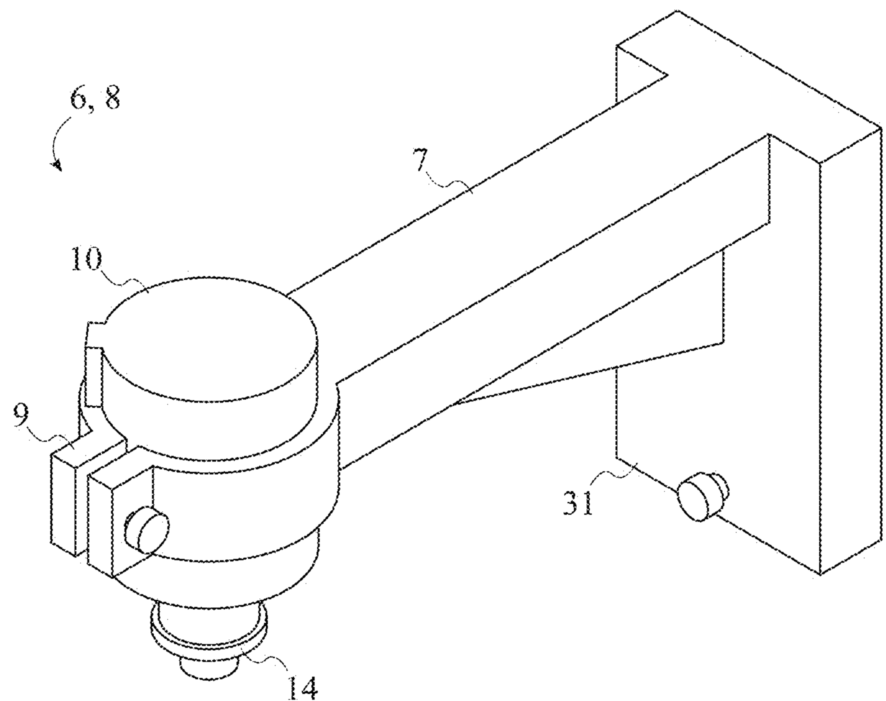
FIG. 28 is a top-front-left perspective view of a mount body and a specific accessory amount of the present invention, wherein an accessory-attachment mechanism for a photography light is shown mount in a first configuration.
Figure 29:
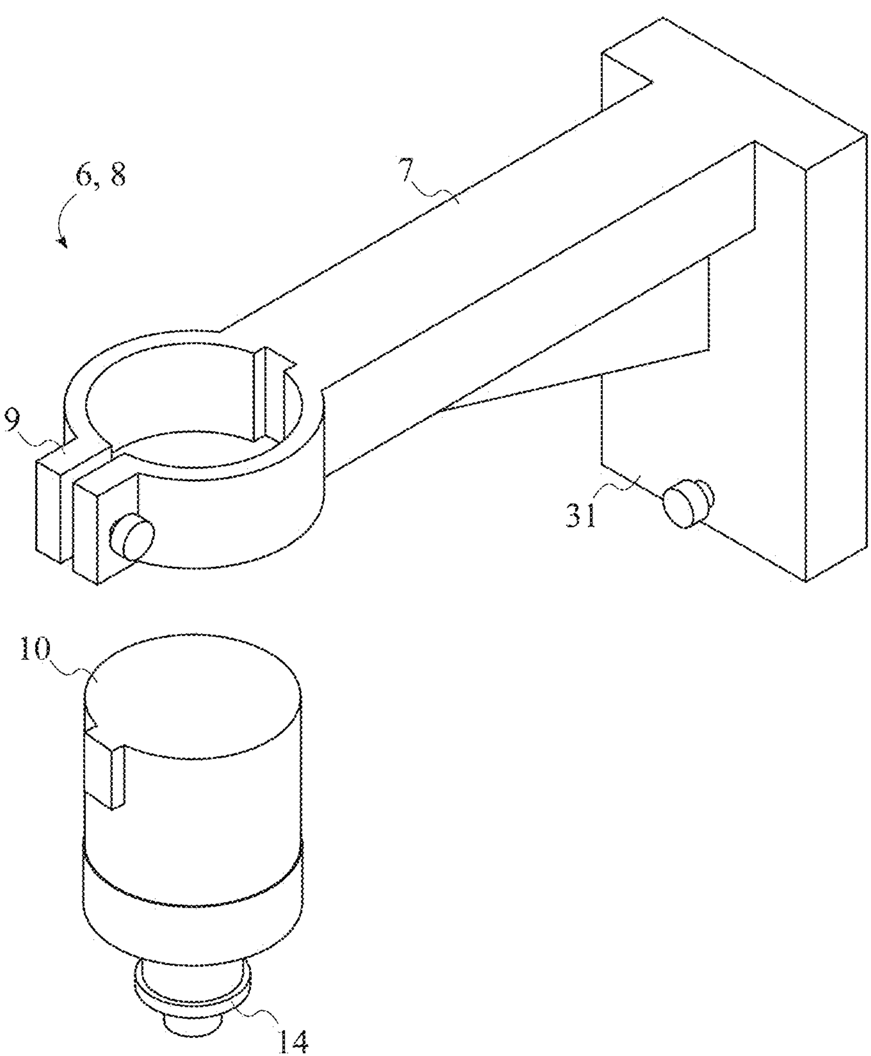
FIG. 29 is a top-front-left exploded perspective view of the mount body and the specific accessory amount of the present invention thereof.
Figure 30:
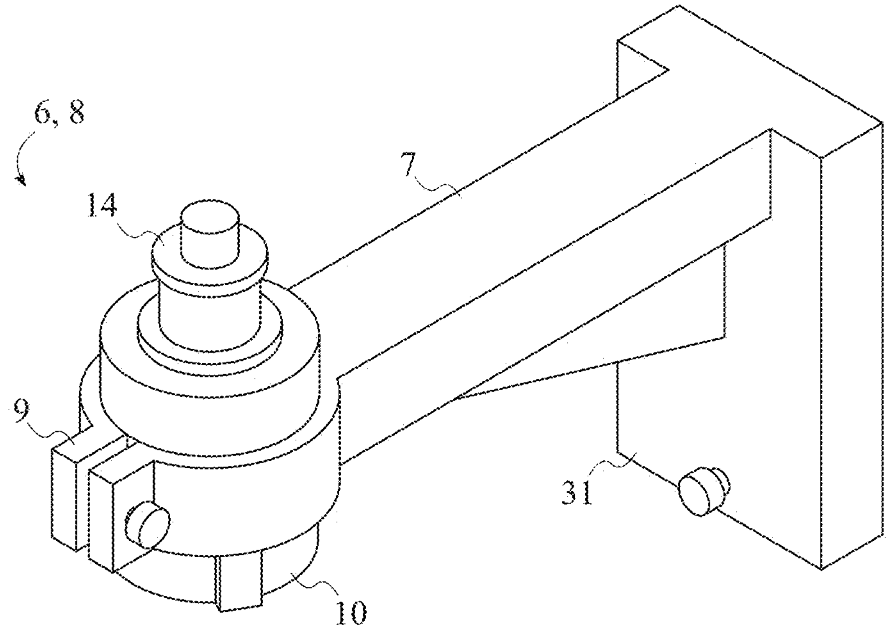
FIG. 30 is a top-front-left perspective view of a mount body and a specific accessory amount of the present invention, wherein an accessory-attachment mechanism for a photography light is shown mount in a second configuration.
Figure 31:
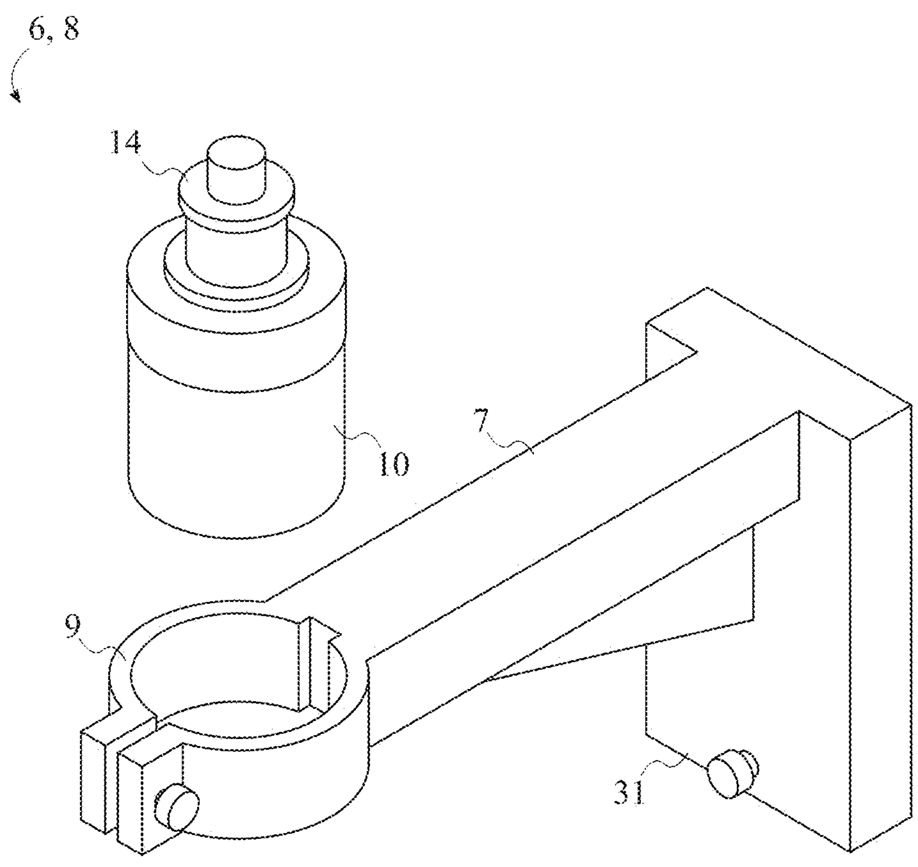
FIG. 31 is a top-front-left exploded perspective view of the mount body and the specific accessory amount of the present invention thereof.
Figure 32:
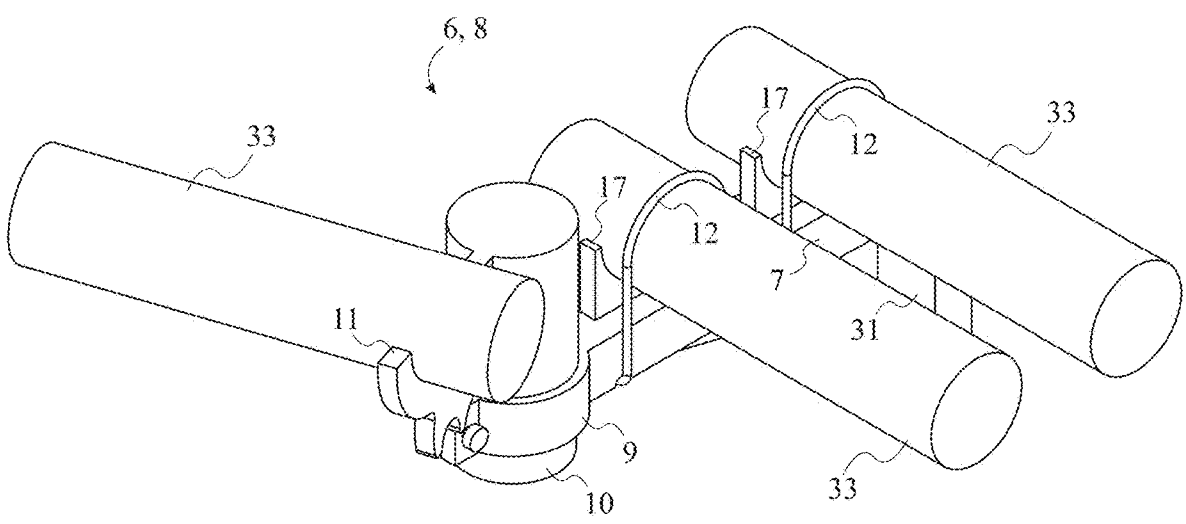
FIG. 32 is a top-front-left perspective view of a mount body and a specific accessory amount of the present invention, wherein a fixed pole-situating saddle and several free pole-situating saddles are shown, and wherein several backdrop poles are shown mounted to each pole-situating saddle.
Figure 33:
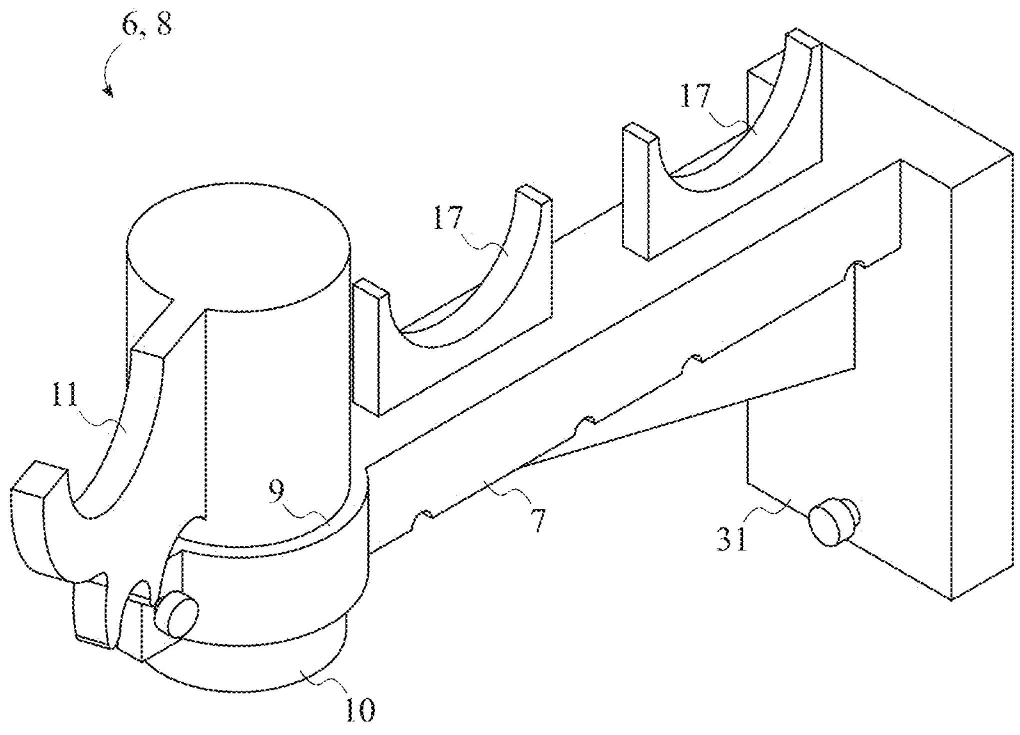
FIG. 33 is a top-front-left perspective view of a mount body and a specific accessory amount of the present invention, wherein the mount body is shown without the backdrop poles.
Figure 34:
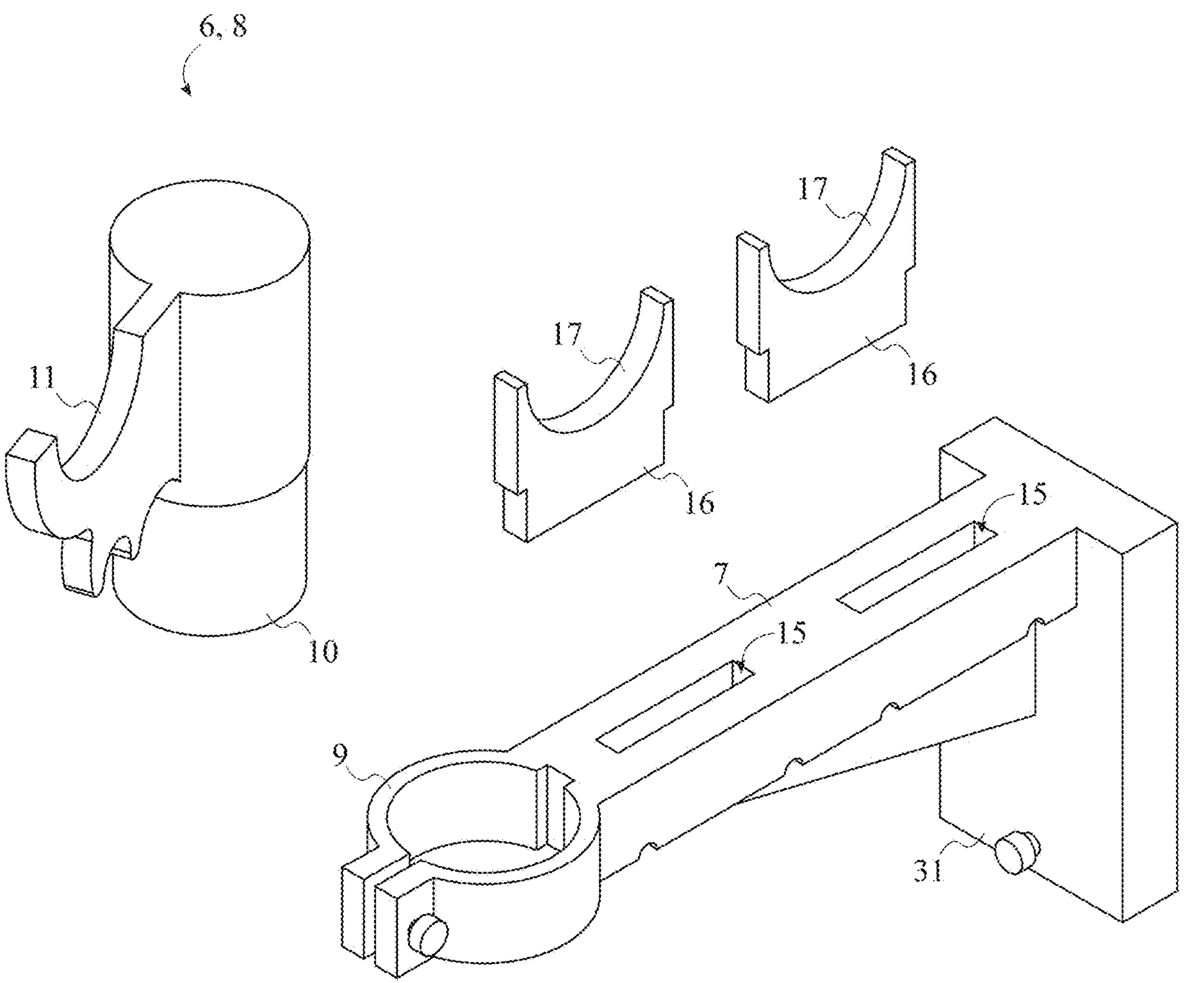
FIG. 34 is a top-front-left exploded perspective view of the mount body and the specific accessory amount of the present invention thereof.

In general, the at least one telescopic pole 4 includes two tubular bodies of different cross-sectional diameters, with one tubular body having a smaller diameter than the other tubular body. The diametrically smaller tubular body may not be properly engaged by the support-attachment clamp 25. As can be seen in FIGS. 22 and 23, the support-attachment mechanism 20 of the specific accessory mount 32 may further comprise at least one support-attachment spacer 29 that enables the support-attachment clamp 25 to properly engage the diametrically smaller tubular body. The at least one support-attachment spacer 29 is formed of two smaller pole pieces having the same design as the support-attachment clamp 25. This way, the at least one support-attachment spacer 29 can be positioned in between the support-attachment clamp 25 and the diametrically smaller tubular body of the at least one telescopic pole 4 so that the support-attachment clamp 25 is properly secured. In other embodiments, different mechanisms can be implemented to help engage different tubular sizes or components of the at least one telescopic pole 4.

In some embodiments, the support-attachment mechanism 20 may need to be secure to the free end 5 of the at least one telescopic pole 4 instead of the tubular bodies. This allows the support-attachment mechanism 20 and the supported photography backdrops or accessories to be lifted as high as the at least one telescopic pole 4 can reach. As can be seen in FIGS. 17 through 20, the support-attachment mechanism 20 of the specific accessory mount 32 may comprise a support-attachment base 21, a support-attachment socket 30, and a support-attachment adapter 23. The support-attachment base 21 corresponds to the structure of the support-attachment mechanism 20 that connects the support-attachment adapter 23 to the support-attachment socket 30. The support-attachment socket 30 allows the support-attachment mechanism 20 to be terminally attached to the free end 5 of the at least one telescopic pole 4. The support-attachment adapter 23 allows the removable attachment of the mount body 7 to the support-attachment mechanism 20. Like the magnetic version of the support-attachment mechanism 20, the support-attachment adapter 23 is preferably the pin portion of a dovetail joint that receives the socket portion of the dovetail joint integrated into the mount body 7. This way, the mount body 7 of different accessory mounts of the plurality of accessory mounts 6 can be attached to the same support-attachment base 21 of a support-attachment mechanism 20.

As can be seen in FIGS. 17 through 20, in this embodiment, the support-attachment socket 30 is connected adjacent to the support-attachment base 21 to receive the specific mount body 7. The support-attachment socket 30 is aligned parallel to the support-attachment base 21 to maintain the mount body 7 in an upright position. Further, the support-attachment adapter 23 is connected adjacent to the support-attachment base 21, offset from the support-attachment socket 30, so that the support-attachment adapter 23 can engage the at least one telescopic pole 4 without obstructing the support-attachment adapter 23. Furthermore, a free end 5 of the at least one telescopic pole 4 is attached into the support-attachment socket 30 to secure the support-attachment socket 30 to the free end 5 of the at least one telescopic pole 4. The support-attachment socket 30 may include a female socket fastener that receives a male fastener integrated onto the free end 5 of the at least one telescopic pole 4. In other embodiments, the support-attachment mechanism 20 can be altered to engage different portions of the at least one telescopic pole 4 to support different photography accessories.

As previously discussed, each mount body 7 can be removably attached to a support-attachment mechanism 20 using the support-attachment adapter 23. As can be seen in FIGS. 3 through 18, the enable the removable attachment of each mount body 7 to any support-attachment mechanism 20, each of the plurality of accessory mounts 6 may further comprise an adapter-receiving fixture 31 that accommodates the support-attachment adapter 23 of the support-attachment mechanism 20. The adapter-receiving fixture 31 is preferably the socket portion of the dovetail joint that compliments the support-attachment adapter 23 of the support-attachment mechanism 20 that corresponds to the pin portion of the dovetail joint. This way, any mount body 7 of the plurality of accessory mounts 6 can be attached to the any support-attachment mechanism 20 of the plurality of accessory mounts 6. Further, the adapter-receiving fixture 31 is connected adjacent to the mount body 7, offset from the accessory-attachment mechanism 8. In general, the mount body 7 is an elongated bar structure with integrated structural supports that offsets the accessory-attachment mechanism 8 from the support-attachment mechanism 20. Furthermore, a support-attachment adapter 23 of the support-attachment mechanism 20 for the specific accessory mount 32 is attached into the adapter-receiving fixture 31 to removably attach the desired mount body 7 to the specific support-attachment mechanism 20. This way, any mount body 7 with the corresponding accessory-attachment mechanism 8 can be secured to the available elongated supports of the plurality of elongated supports 1 using the appropriate support-attachment mechanism 20 to form the desired support assembly.

As previously discussed, the plurality of accessory mounts 6 can support one or more photography backdrops. The plurality of accessory mounts 6 preferably support the at least one backdrop pole 33 of the desired photography backdrop, either in a fixed configuration or in an adjustable configuration. As can be seen in FIGS. 32 through 38 and 41 through 48, in the adjustable configuration, the plurality of accessory mounts 6 can allow a backdrop pole 33 to be rotated to orient adjacent backdrops at an angle with each other. To do so, the accessory-attachment mechanism 8 of the specific accessory mount 32 may comprise a tube clamp 9, an accessory-attachment cylinder 10, a fixed pole-situating saddle 11, and a pole-restraining tether 12. The tube clamp 9 corresponds to a smaller clamp that holds the accessory-attachment cylinder 10 in such a way that the accessory-attachment cylinder 10 can be rotated on the tube clamp 9. The accessory-attachment cylinder 10 enables the attachment of the fixed pole-situating saddle 11 to the tube clamp 9. Further, the pole-restraining tether 12 secures the mounted backdrop pole 33 to the fixed pole-situating saddle 11.

As can be seen in FIGS. 32 through 38 and 41 through 48, in the adjustable configuration, the accessory-attachment mechanism 8 can be arranged as follows: the tube clamp 9 is connected adjacent to the mount body 7, opposite to the support-attachment mechanism 20, to terminally integrate the tube clamp 9 onto the mount body 7. In addition, the tube clamp 9 is laterally pressed around the accessory-attachment cylinder 10 to secure the accessory-attachment cylinder 10 to the mount body 7 while allowing the accessory-attachment cylinder 10 to rotate on the tube clamp 9. Further, the fixed pole-situating saddle 11 is laterally connected to the accessory-attachment cylinder 10, offset from the tube clamp 9, to receive the desired at least one backdrop pole 33. The fixed pole-situating saddle 11 has a shape and size matching the cross-sectional shape and size of the desired at least one backdrop pole 33. This way, the at least one backdrop pole 33 can be easily situated on the fixed pole-situating saddle 11 while also being able to be rotated. Furthermore, the pole-restraining tether 12 is tensionably attached to the fixed pole-situating saddle 11 to secure the at least one backdrop pole 33 to the fixed pole-situating saddle 11. The pole-restraining tether 12 can be a tiedown bungee cord or similar elastic tether that can be wrapped about the at least one backdrop pole 33 and fastened to the fixed pole-situating saddle 11. This way, the mounted at least one backdrop pole 33 can be securely rotated to adjust the position and/or orientation of the photography backdrop.

Figure 35:
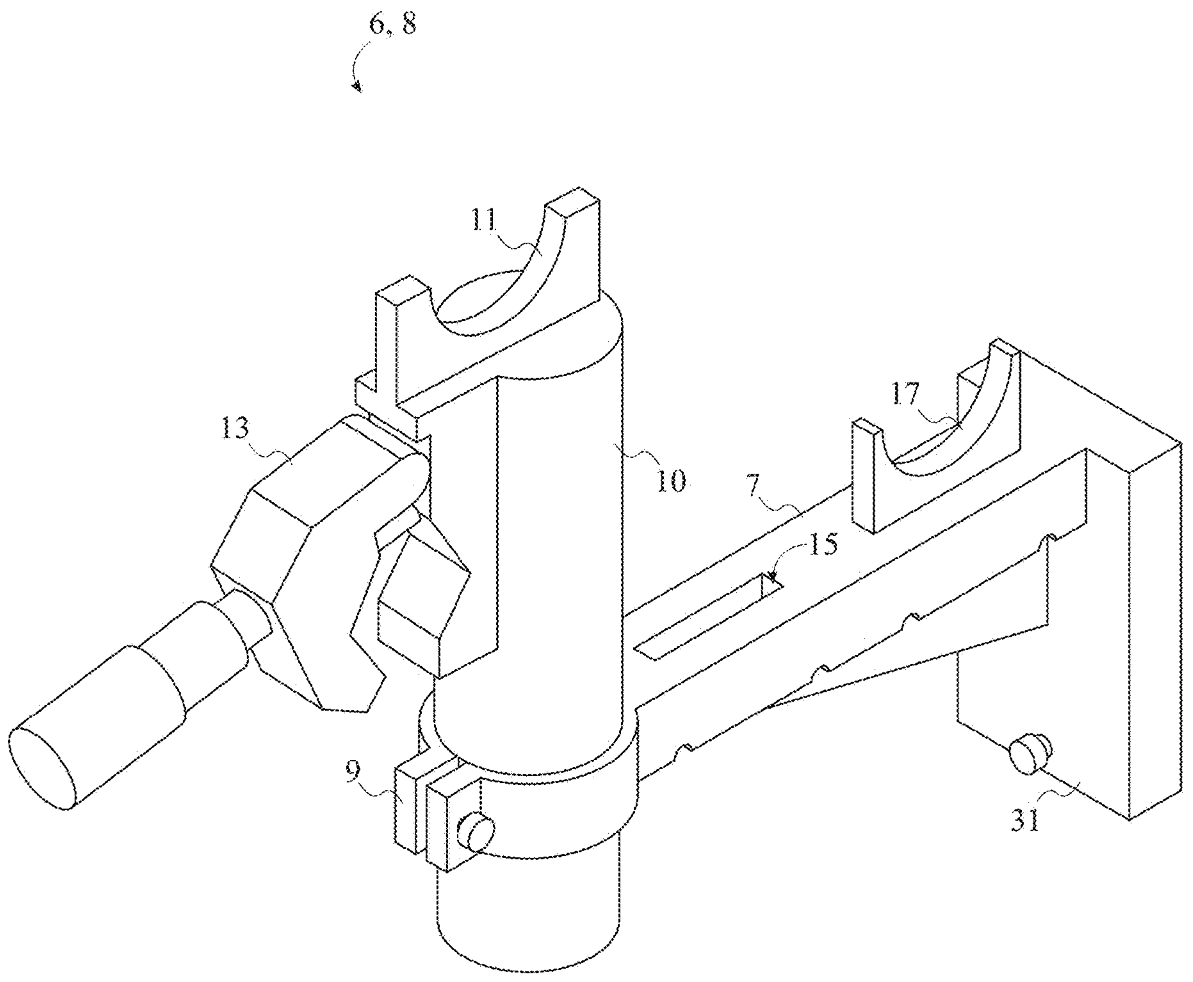
FIG. 35 is a top-front-left perspective view of a mount body and a specific accessory amount of the present invention, wherein a pole-restraining clamp and a free pole-situating saddle are shown.

In some embodiments, the backdrop may not be easily mounted to the accessory-attachment mechanism 8 without the accessory-attachment mechanism 8 interfering with the backdrop, or if the backdrop is a canvas, paper, or other ridged material. As can be seen in FIG. 35, in this embodiment, the accessory-attachment mechanism 8 of the specific accessory mount 32 may further comprise a pole-restraining clamp 13 that can engage the at least one backdrop pole 33 without interfering with the backdrop or engage the backdrop directly. Similar to the fixed pole-situating saddle 11, the pole-restraining clamp 13 is laterally connected to the accessory-attachment cylinder 10, offset from the tube clamp 9, so that the pole-restraining clamp 13 can engage the at least one backdrop pole 33 or the backdrop directly. Further, the pole-restraining clamp 13 may further include a temporary pole-situating saddle that can be used to retain the at least one backdrop pole 33 temporarily until the user establishes the final setup of the support assembly. In other embodiments, different attachment mechanisms can be implemented to retain the at least one backdrop pole 33 or other portions of the desired backdrop that may require special support.

As previously discussed, the plurality of accessory mounts 6 can accommodate other photography accessories, such as photography lights 34, to construct the desired support assembly. As can be seen in FIGS. 28 through 31, in some embodiments, the accessory-attachment mechanism 8 of the specific accessory mount 32 may further comprise a light-restraining male fastener 14 that allows the removable mounting of the desired at least one photography light 34 to the accessory-attachment mechanism 8. The light-restraining male fastener 14 is preferably a light stand spigot that engages the structure of the at least one photography light 34. The light-restraining male fastener 14 is terminally connected to the accessory-attachment cylinder 10, offset from the tube clamp 9, to engage the desired at least one photography light 34. Further, the accessory-attachment cylinder 10 and the tube clamp 9 may be non-rotatably connected to each other by implementing a twist-lock mechanism. The twist-lock mechanism further secures the accessory-attachment cylinder 10 to the tube clamp 9 to ensure the at least one photography light 34 remains in the desired position and orientation. The socket portion of the twist-lock mechanism can be integrated into the tube clamp 9, while the pin portion is laterally integrated onto the accessory-attachment cylinder 10. As a result, the accessory-attachment cylinder 10 can be secured to the tube clamp 9 without the accessory-attachment cylinder 10 displacing vertically due to the load of the attached at least one photography light 34. This also allows the at least one photography light 34 to be mounted above the mount body 7 by orienting the light-restraining male fastener 14 away from the ground or mounted below the mount body 7 by orienting the light-restraining male fastener 14 towards the ground. In other embodiments, different fasteners or adapters can be implemented to allow the attachment of other photography accessories.

As previously discussed, the accessory-attachment mechanism 8 of the specific accessory mount 32 can hold one or more backdrops in a fixed position and/or orientation. As can be seen in FIGS. 33 through 40, the accessory-attachment mechanism 8 of the specific accessory mount 32 may further comprise a saddle-securing slot 15, a saddle-securing insert 16, and a free pole-situating saddle 17. The saddle-securing slot 15 is an opening on the mount body 7 that accommodates the saddle-securing insert 16. The saddle-securing insert 16 enables the attachment of the free pole-situating saddle 17 to the mount body 7. Unlike the fixed pole-situating saddle 11, the free pole-situating saddle 17 retains the desired at least one backdrop pole 33 in a specific orientation relative to the specific elongated support 2 that supports the specific accessory mount 32. To do so, the saddle-receiving slot laterally traverses into the mount body 7, offset from the support-attachment mechanism 20, to form an opening with a shape and size matching the saddle-securing insert 16. The free pole-situating saddle 17 is connected adjacent to the saddle-securing insert 16, external to the saddle-securing slot 15, to form a single structure. Further, the saddle-securing insert 16 is attached into the saddle-securing slot 15 to secure the free pole-situating saddle 17 to the mount body 7. Furthermore, a pole-restraining tether 12 is tensionably attached to the mount body 7, adjacent to the free pole-situating saddle 17, to secure the at least one backdrop pole 33 to the free pole-situating saddle 17 for secure mounting of the at least on backdrop pole 33.

In some embodiments, several backdrop poles 33 can be mounted onto the mount body 7 using several free pole-situating saddles 17. As can be seen in FIGS. 33 through 40, a plurality of saddle-securing slots 15 is distributed along the mount body 7. The number of saddle-securing slots 15 depends on the length of the mount body 7. Further, a plurality of free pole-situating saddles 17, each with a corresponding saddle-securing insert 16, is provided. The user can attach the desired number of free pole-situating saddles 17 into the corresponding saddle-securing slots 15 depending on the number of backdrop poles 33 necessary. Furthermore, in some embodiments, a single saddle-securing slot 15 can be integrated into the support-attachment base 21 of the terminal version of the support-attachment mechanism 20. This allows a single backdrop pole 33 to be mounted onto the free end 5 of the specific elongated support 2, such as the free end 5 of a speaker/light support stand. In an alternate embodiment, the free pole-situating saddle 17 can be a dual pole-situating saddle that accommodates two backdrop poles 33. In other embodiments, the free-pole situating saddle can be attached to different components of the support attachment mechanism or the accessory-attachment mechanism 8 of the specific accessory mount 32.

Figure 36:
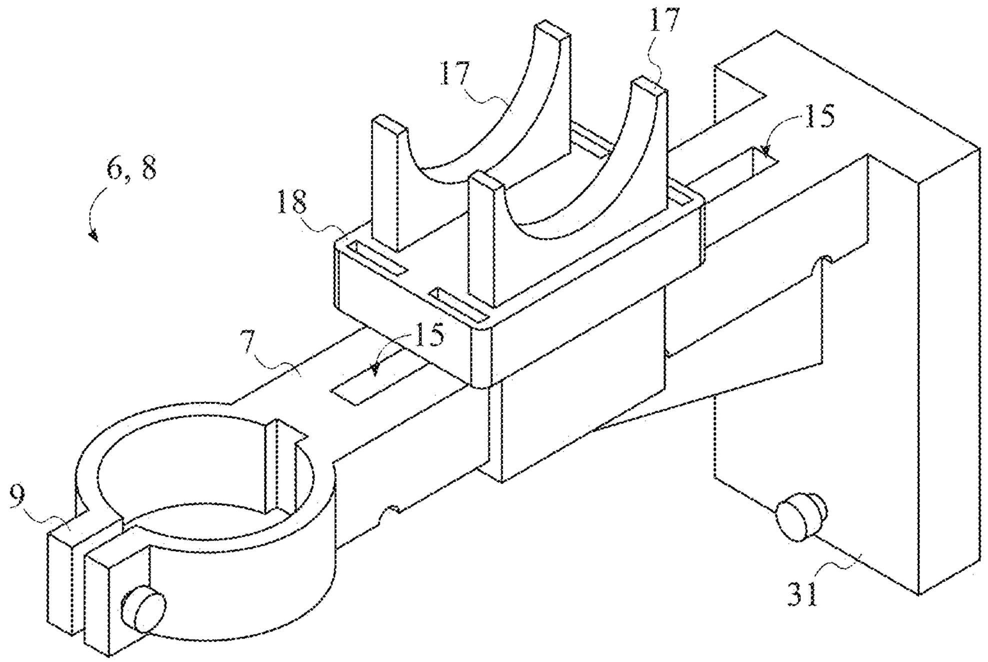
FIG. 36 is a top-front-left perspective view of a mount body and a specific accessory amount of the present invention, wherein a first embodiment of an accessory-attachment carriage is shown.
Figure 37:
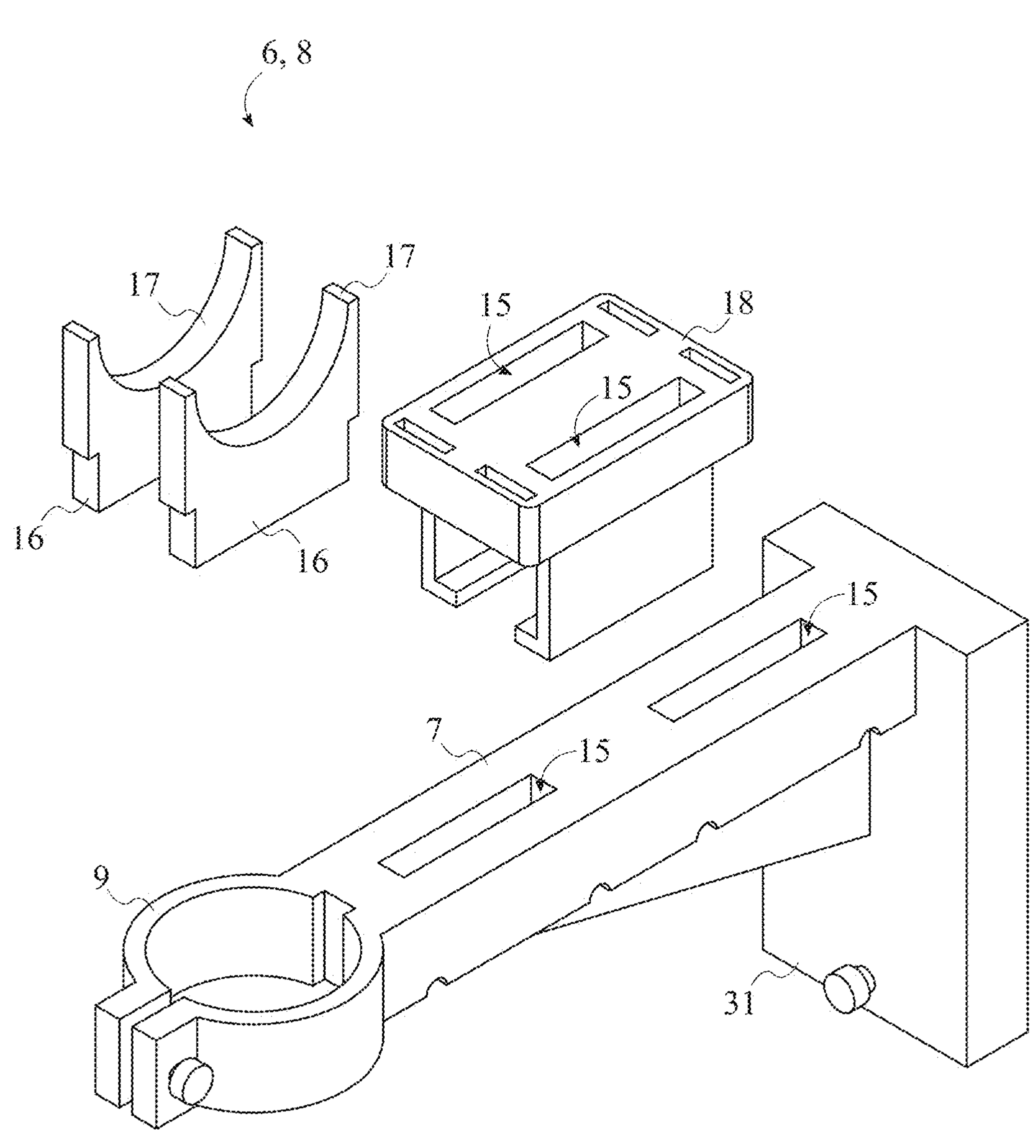
FIG. 37 is a top-front-left exploded perspective view of the mount body and the specific accessory amount of the present invention thereof.
Figure 38:
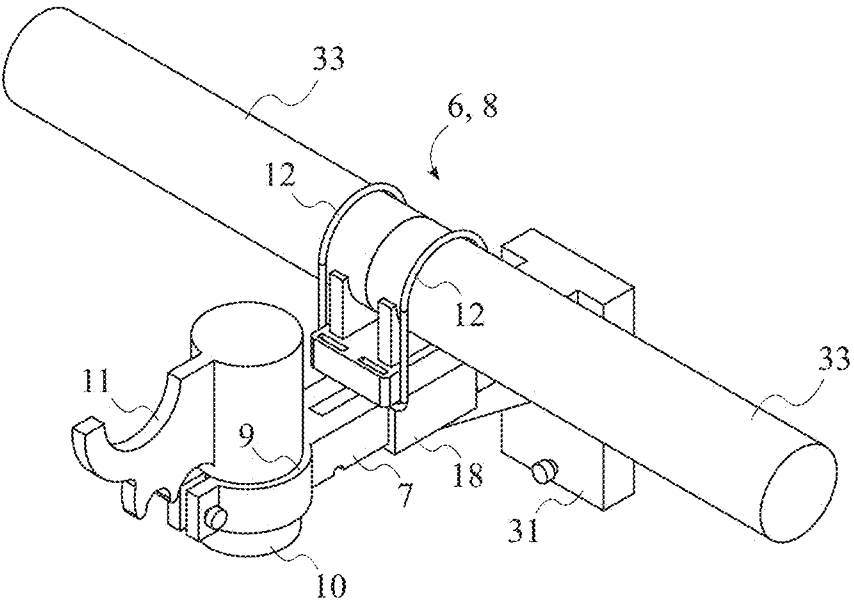
FIG. 38 is a top-front-left perspective view of the mount body and the specific accessory amount of the present invention thereof, wherein two backdrop poles are shown mounted onto the accessory-attachment carriage.

In some embodiments, two backdrop poles 33 may be necessary to be aligned with each other so that the corresponding backdrops are positioned coplanar to each other. As can be seen in FIGS. 36 through 38, the accessory-attachment mechanism 8 of the specific accessory mount 32 may further comprise an accessory-attachment carriage 18 and a carriage-securing lock 19. The accessory-attachment carriage 18 allows several units of the free pole-situating saddle 17 to be mounted in line with each other. To do so, the accessory-attachment carriage 18 is slidably attached along the mount body 7 so that the user can adjust the position of the accessory-attachment carriage 18 along the mount body 7. In addition, the carriage-securing lock 19 is operatively integrated between the mount body 7 and the accessory-attachment carriage 18, wherein the carriage-securing lock 19 is used to secure the accessory-attachment carriage 18 in place along the mount body 7. For example, the carriage-securing lock 19 can be a locking knob that can be tightened to lock the accessory-attachment carriage 18 in place or loosened to allow the accessory-attachment carriage 18 to be moved. Further, each saddle-receiving slot laterally traverses into the accessory-attachment carriage 18, opposite to the mount body 7, to receive a free pole-situating saddle 17 using the corresponding saddle-securing insert 16. Two support two backdrop poles 33 so that both backdrop poles 33 are aligned with each other, the two saddle-securing slots 15 are positioned parallel and offset to each other along the accessory-attachment carriage 18. As a result, the attached free pole-situating saddles 17 are also positioned parallel and aligned to each other to receive the two ends of the backdrop poles 33 so that the corresponding backdrops are coplanar to each other. In other embodiments, the accessory-attachment carriage 18 may include a cylindrical protrusion that allows the accessory-attachment carriage 18 to be secured to the tube clamp 9 of the accessory-attachment mechanism 8.

Figure 39:
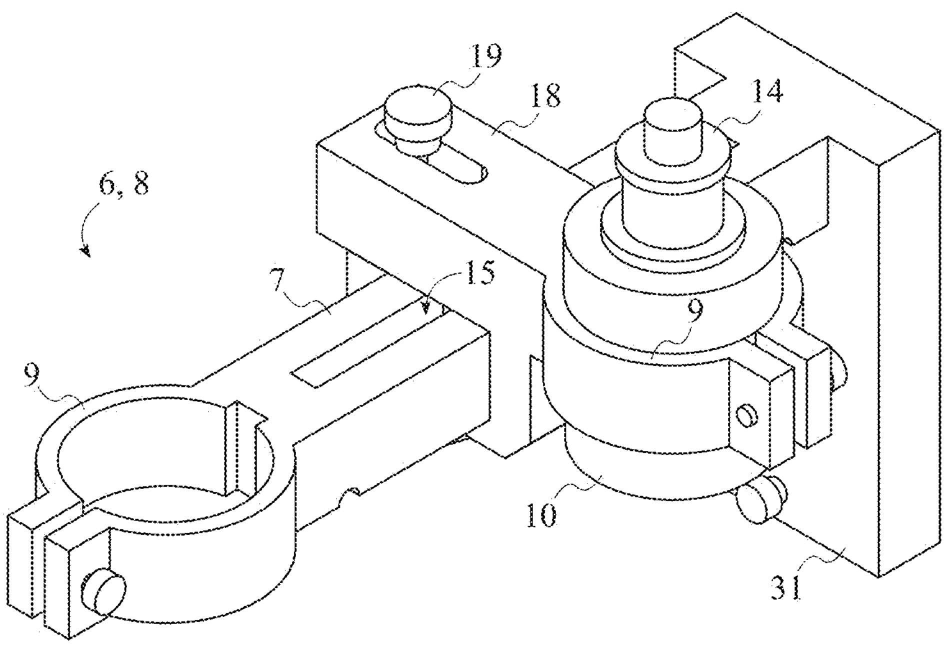
FIG. 39 is a top-front-left perspective view of a mount body and a specific accessory amount of the present invention, wherein a second embodiment of the accessory-attachment carriage is shown.
Figure 40:
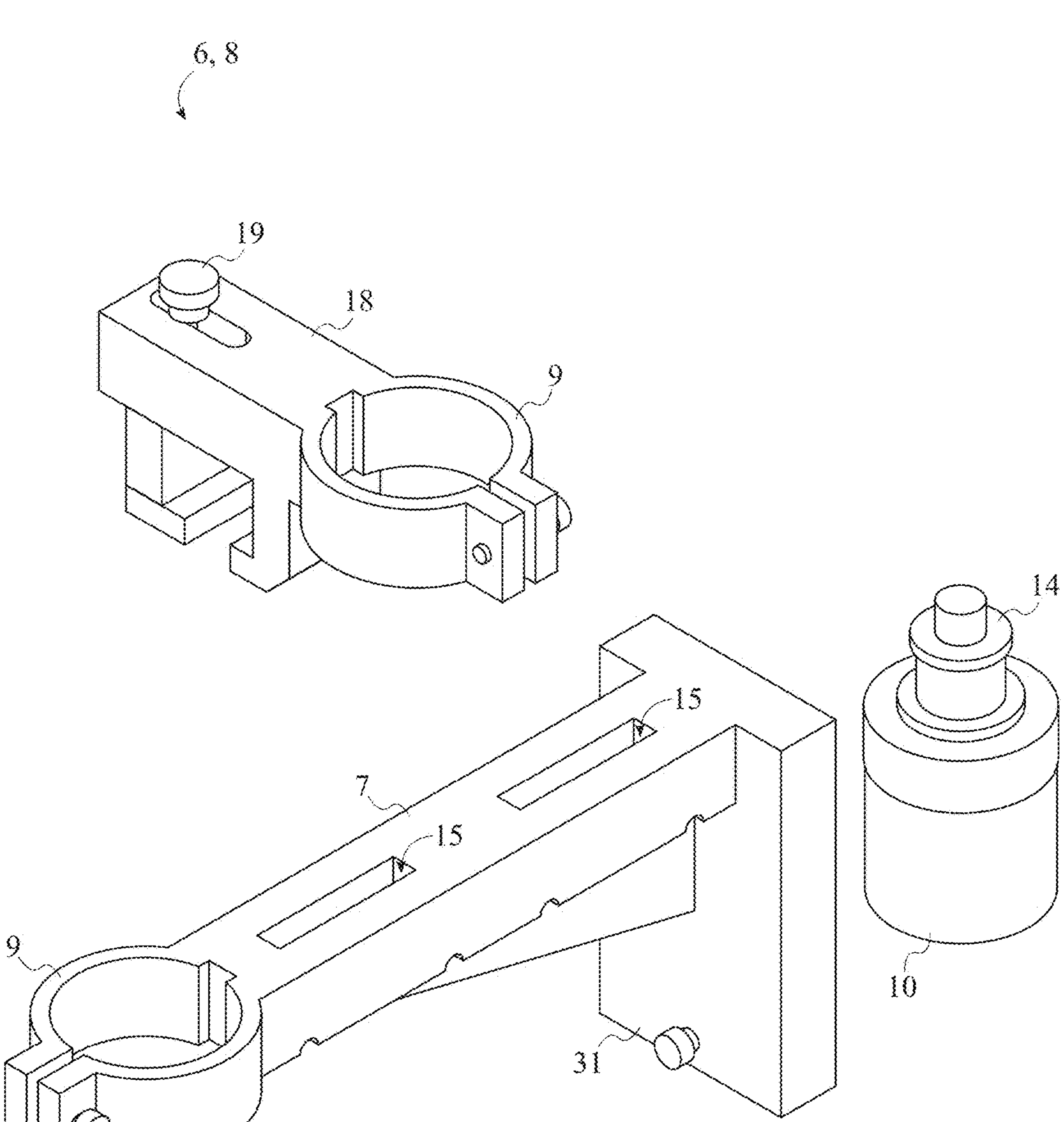
FIG. 40 is a top-front-left exploded perspective view of the mount body and the specific accessory amount of the present invention thereof.

In another embodiment, the accessory-attachment carriage 18 may support a light-restraining male fastener 14 using an integrated tube clamp 9. As can be seen in FIGS. 39 and 40, the tube clamp 9 is connected adjacent to the accessory-attachment carriage 18, opposite to the mount body 7, so that the tube clamp 9 is positioned on one side of the mount body 7. Further, the tube clamp 9 is laterally pressed around the accessory-attachment cylinder 10 to secure the accessory-attachment cylinder 10 to the tube clamp 9. In addition, the accessory-attachment cylinder 10 and the tube clamp 9 may also be non-rotatably connected to each other by implementing a twist-lock mechanism. The socket portion of the twist-lock mechanism can be integrated into the tube clamp 9, while the pin portion is laterally integrated onto the accessory-attachment cylinder 10. This way the attached at least one photography light 34 remains in the desired position and orientation. Furthermore, the light-restraining male fastener 14 is terminally connected to the accessory-attachment cylinder 10, offset from the tube clamp 9, to receive the desired at least one photography light 34 without obstructing the other mounted backdrops on the same mount body 7.

In some embodiments, the plurality of accessory mounts 6 may include other components that do not support photography backdrops or other accessories. For example, the plurality of accessory mounts 6 may include a plurality of pole stretchers 35 that help stretch the mounted backdrops if necessary. As can be seen in FIGS. 26 and 27 and 41 through 48, when using at least one telescopic pole 4, a specific pole stretcher of the plurality of pole stretchers 35 comprises a support-attachment clamp 25 and a stretcher arm. The stretcher arm is a curved elongated arm that is terminally connected to the proximal clamping jaw 26 of the support-attachment clamp 25. The stretcher arm further comprises a plurality of tether stoppers laterally integrated along the stretcher arm. The plurality of tether stoppers is distributed along the stretcher arm so that the desired tethers can be fastened to the stretcher arm at specific locations. The desired tethers can be stretcher bungee cords with an incorporated clip that engages the other perimeter of the backdrop. Alternatively, when using at least one metal base 3, the support-attachment clamp 25 is replaced with a magnetic base for the specific pole stretcher, with the stretcher arm being terminally connected to the magnetic base. This way, the specific pole stretcher can be magnetically mounted onto the at least one metal base 3. Alternatively, base of the specific pole stretcher can be modified to slidably connected to a sliding track or directly fastened to a wall. In other embodiments, different stretching mechanisms can be implemented that help stretch the backdrops hung from the constructed support assemblies.

Figure 41:
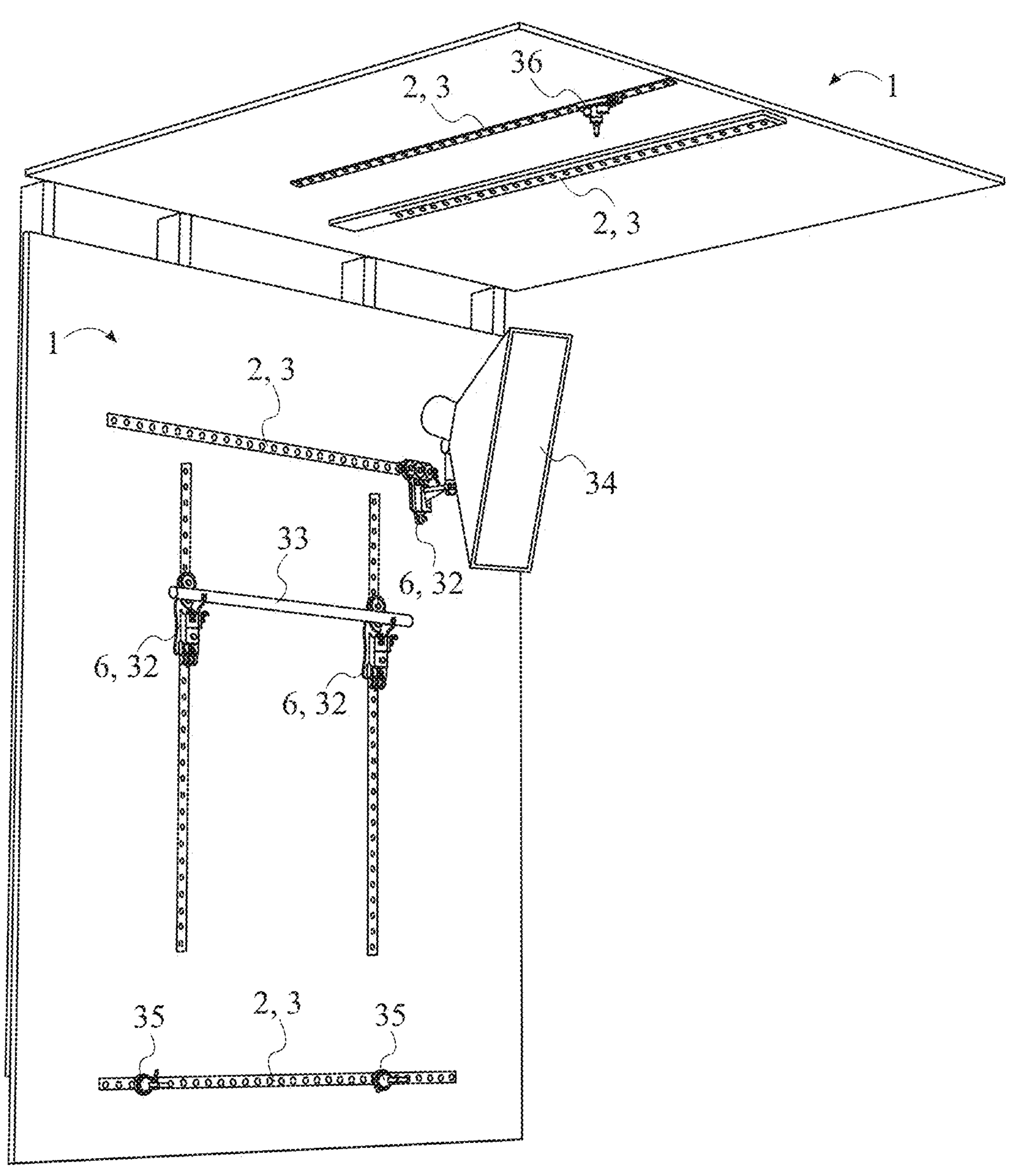
FIG. 41 is a top-front-right perspective of the present invention, wherein the several elongated supports are used with specific accessory mounts to support a backdrop pole and a photography light.
Figure 42:
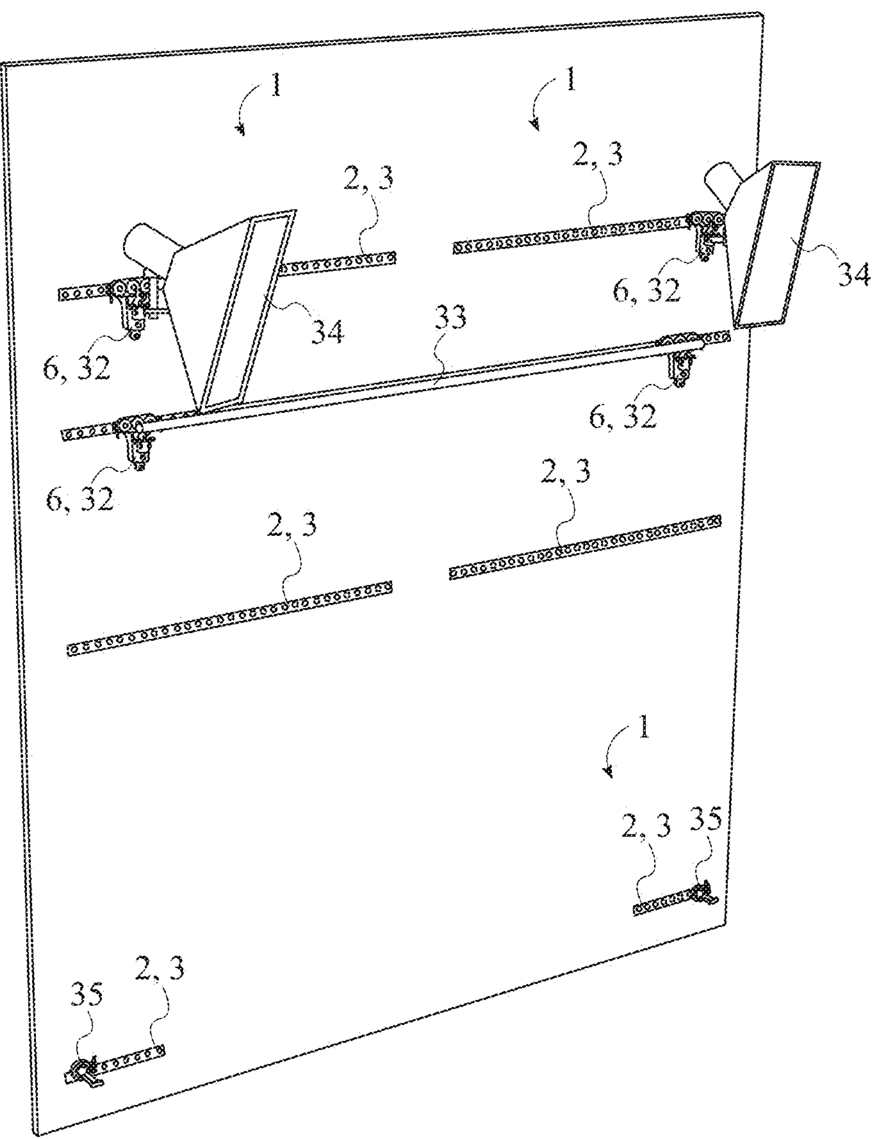
FIG. 42 is a top-front-right perspective of the present invention, wherein the several elongated supports are used with specific accessory mounts to support a backdrop pole and two photography lights.
Figure 43:
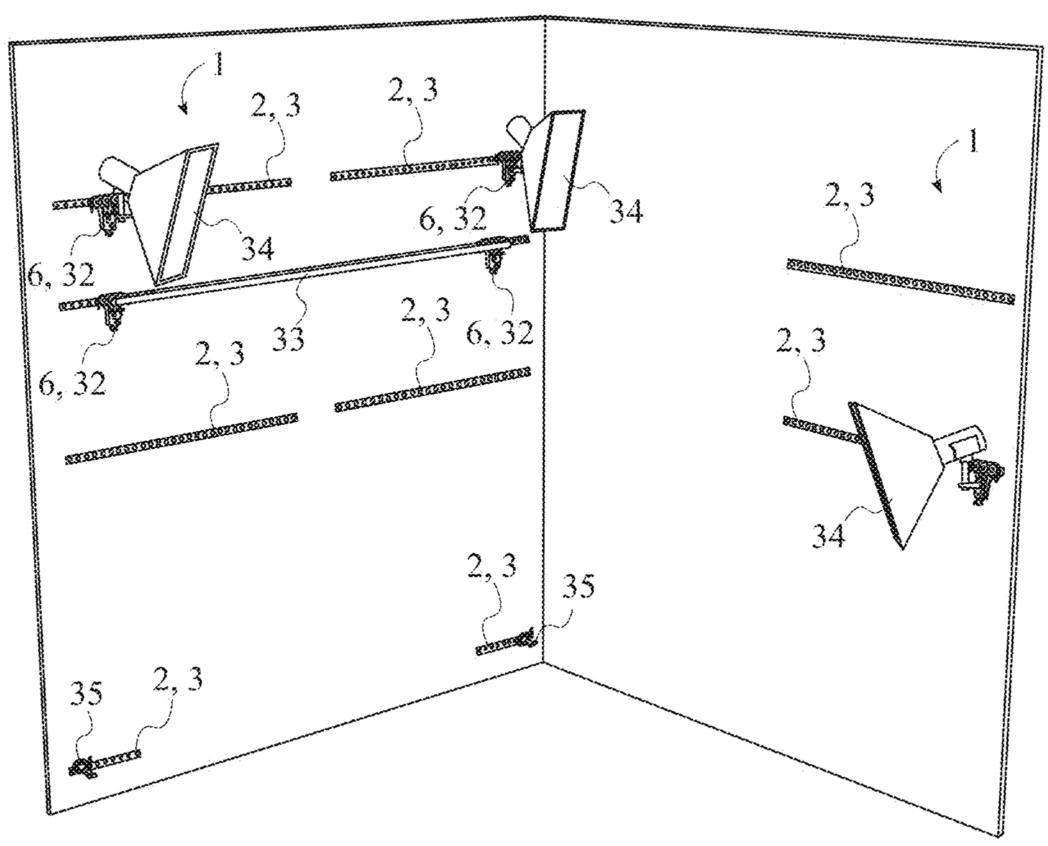
FIG. 43 is a top-front-right perspective of the present invention, wherein the several elongated supports are used with specific accessory mounts to support a backdrop pole and several photography lights in a corner assembly.
Figure 44:
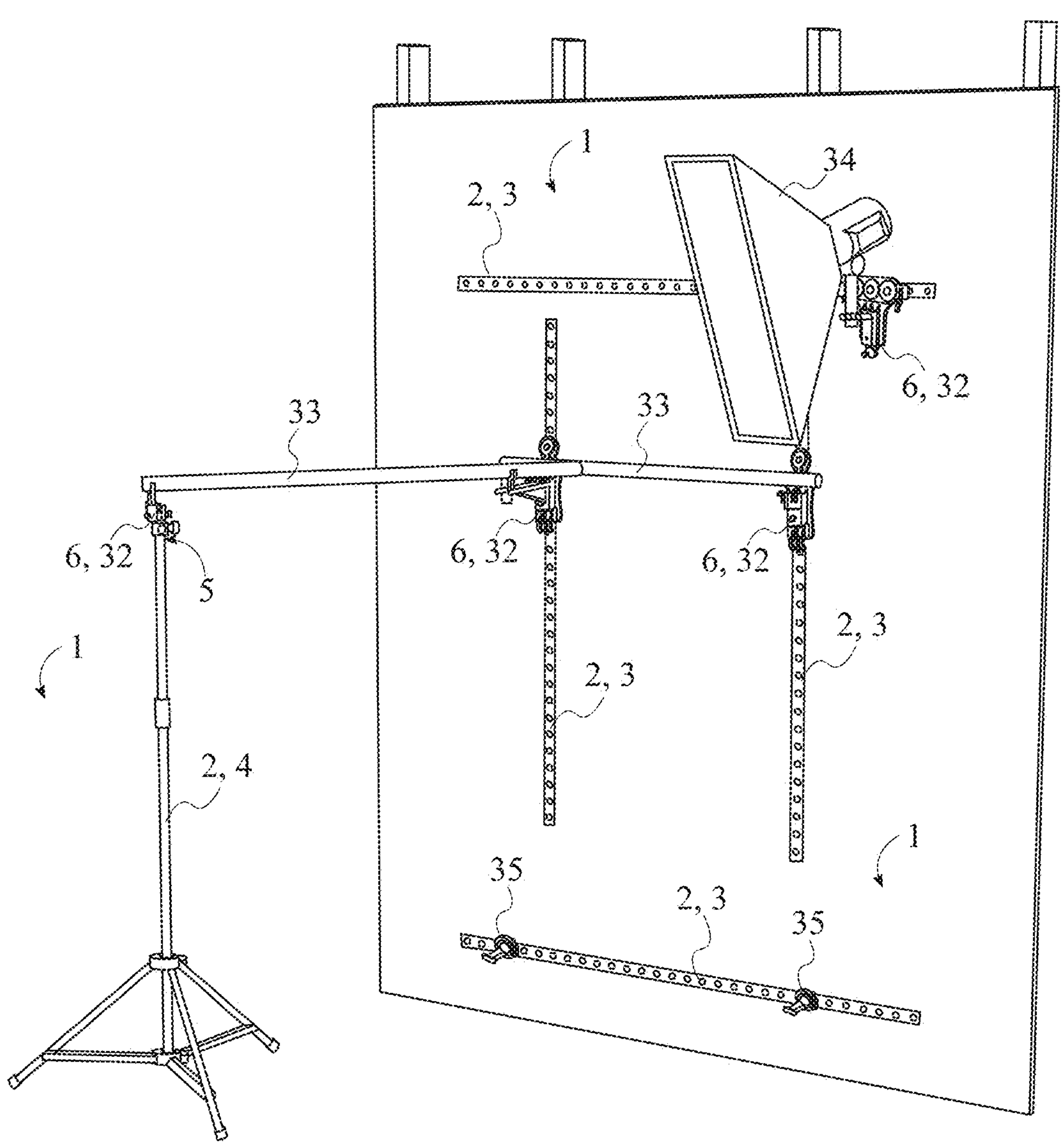
FIG. 44 is a top-front-right perspective of the present invention, wherein the several elongated supports are used with specific accessory mounts to support two backdrop poles and a photography light.
Figure 45:
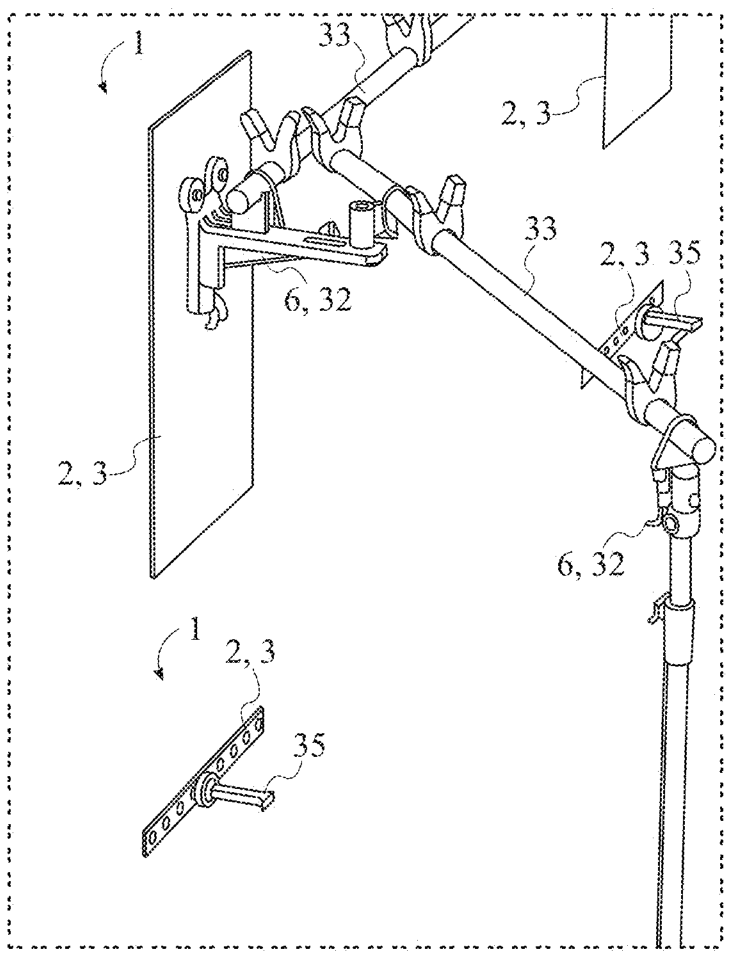
FIG. 45 is a top-front-right perspective of the present invention, wherein specific accessory mounts are used to support two backdrop poles, and wherein a backdrop pole is oriented at an angle with the other backdrop pole.
Figure 46:
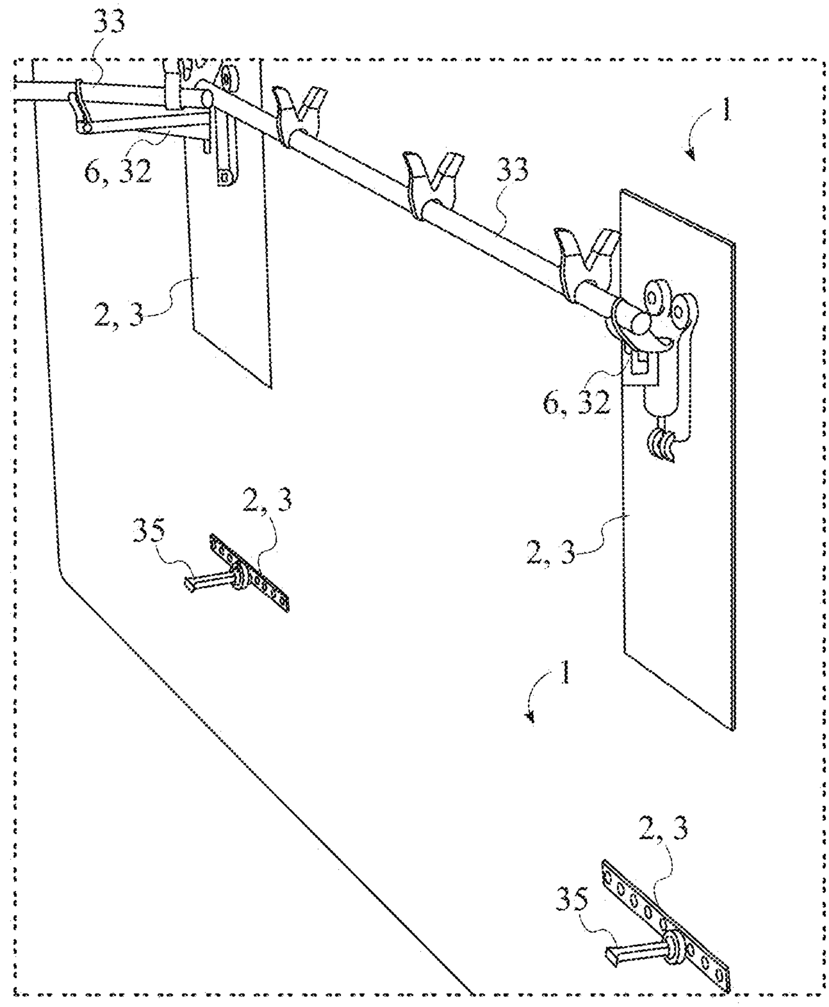
FIG. 46 is a top-front-left perspective of the present invention, wherein specific accessory mounts are used to support two backdrop poles, and wherein a backdrop pole is oriented at an angle with the other backdrop pole.
Figure 47:
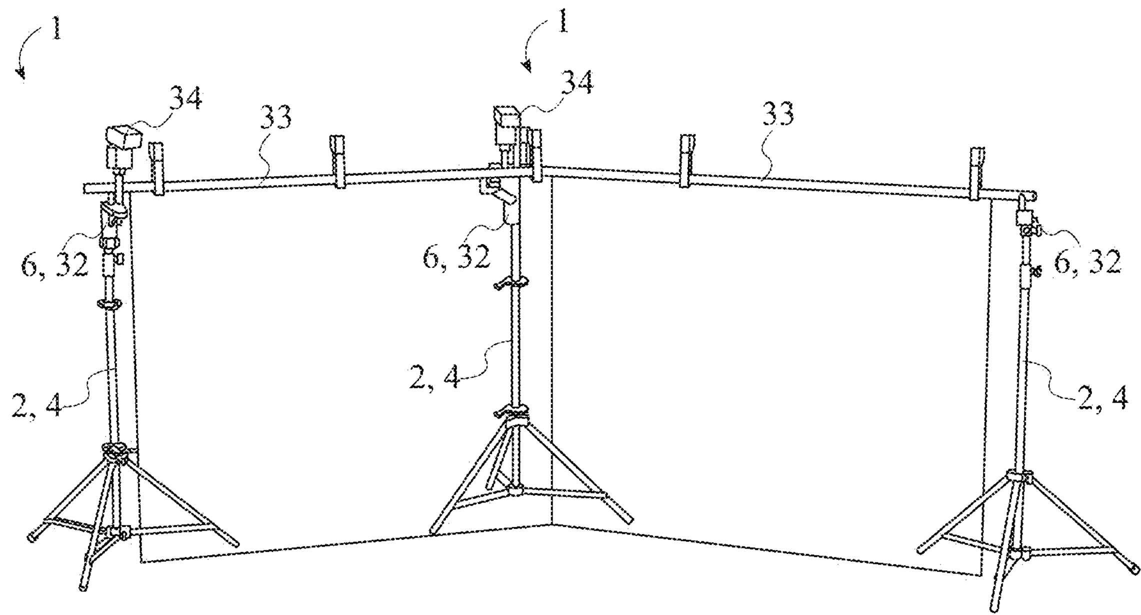
FIG. 47 is a top-front-right perspective of the present invention, wherein several elongated supports are used with specific accessory mounts to support two backdrop poles and two photography lights.
Figure 48:
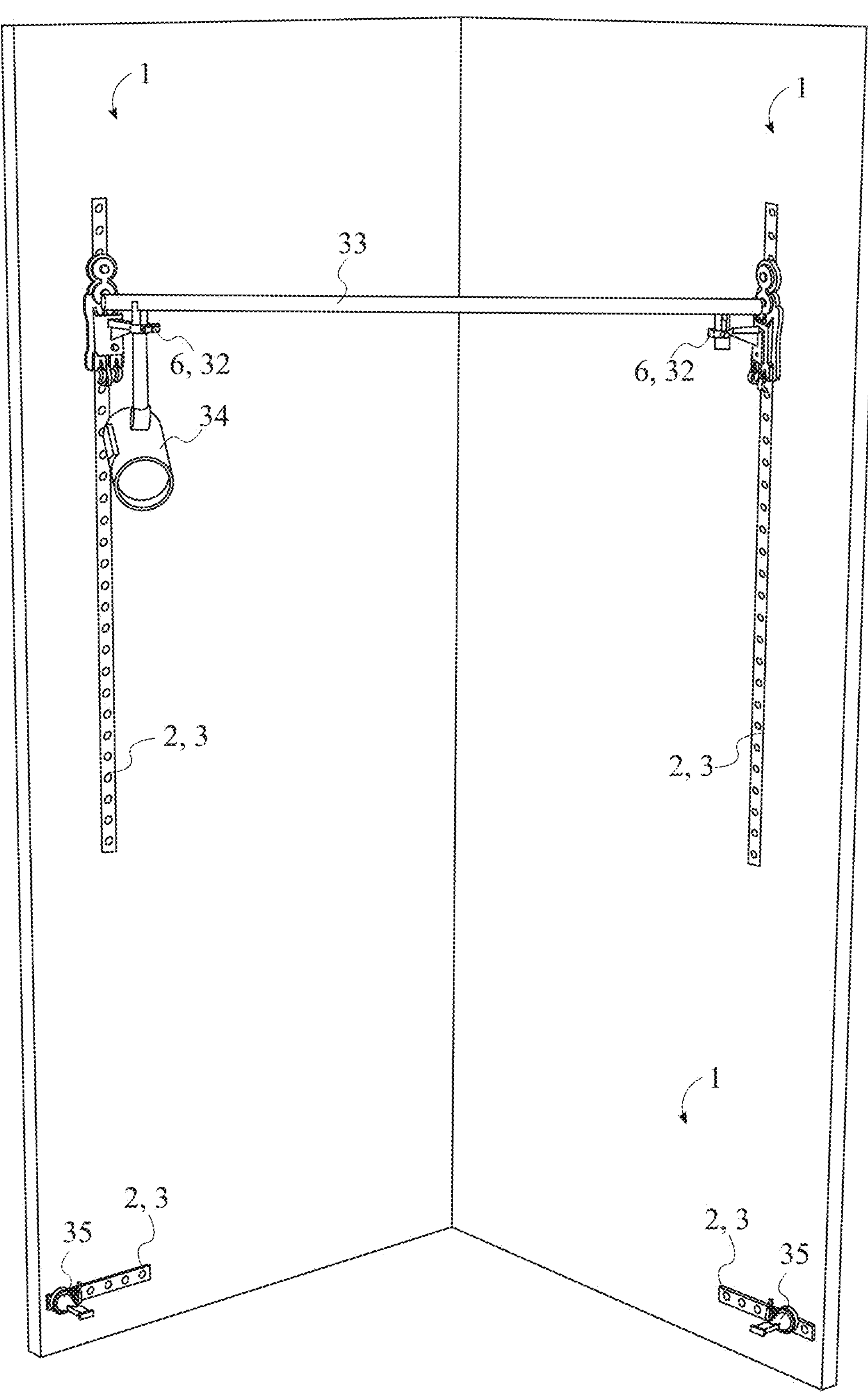
FIG. 48 is a top-front-right perspective of the present invention, wherein the several elongated supports are used with specific accessory mounts to support a backdrop pole and a photography light in a corner assembly.

In other embodiments, the plurality of accessory mounts 6 may include mounts that are not mounted onto an elongated support of the plurality of elongated supports 1. For example, the plurality of accessory mounts 6 may further comprise a free light stem 36 with base that can be directly mounted onto a surface adjacent to the constructed support assembly, such as an adjacent wall or ceiling. As can be seen in FIG. 41, the free light stem 36 with base comprises a stem base that can be fastened to the selected surface utilizing the appropriate fasteners. Similar to the other at least one photography light 34 mounts, the free light stem 36 with base further comprises an accessory-attachment cylinder 10 and a light-restraining male fastener 14. The accessory-attachment cylinder 10 is centered on the stem base and terminally connected to the stem base to secure the accessory-attachment cylinder 10 to the stem base. In addition, the light-restraining male fastener 14 is terminally connected to the accessory-attachment cylinder 10, opposite to the stem base. Thus, the at least one photography light 34 can be attached to a surface adjacent to the constructed support assembly.

Figure 50:
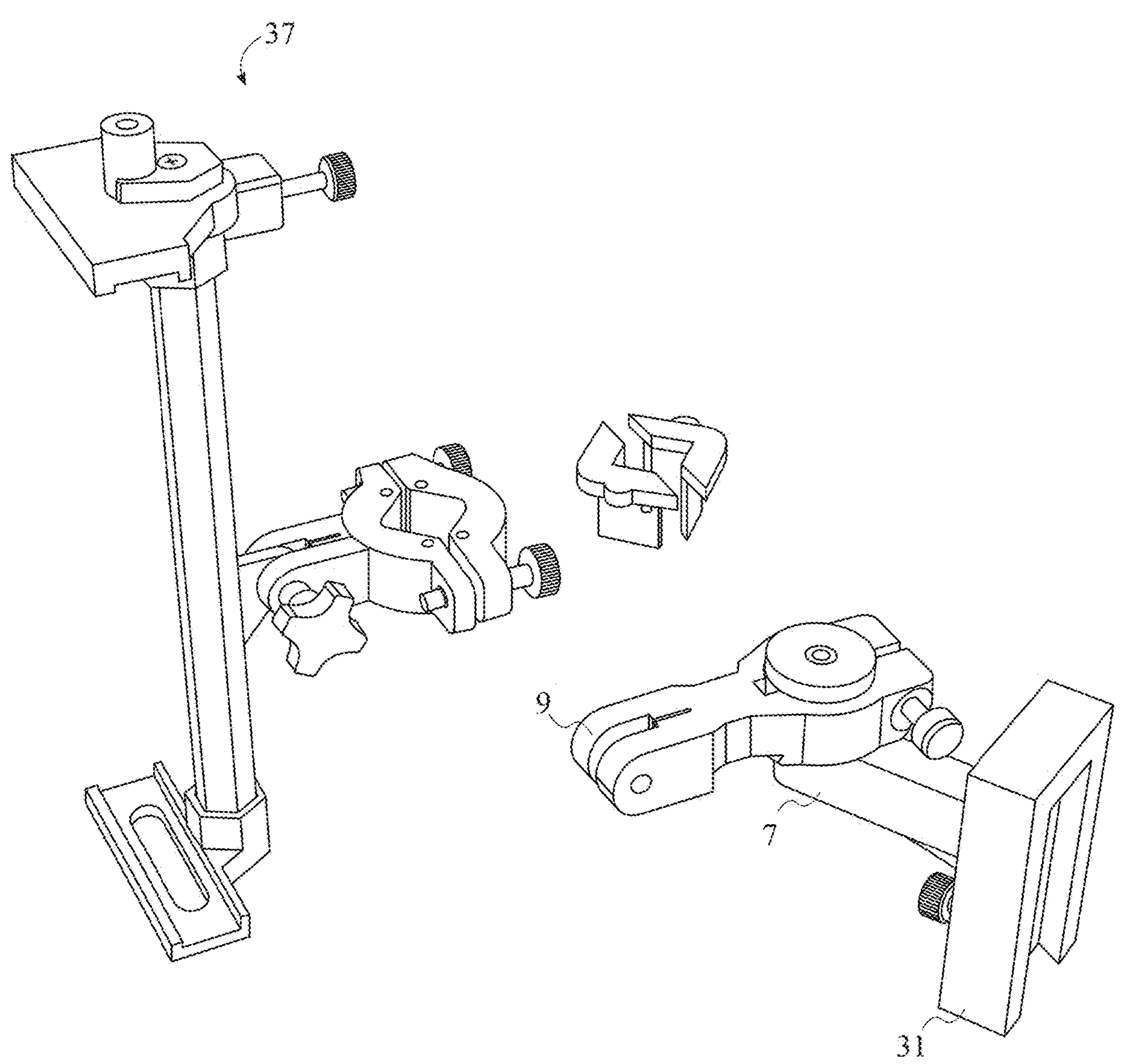
FIG. 50 is a top-front-right perspective of the present invention, wherein a computing device holder of the present invention is shown.

Furthermore, the present invention can accommodate other accessories such as a computing device holder 37. As can be seen in FIG. 50, the computing device holder 37 can accommodate a computing device, such as a cell phone or a tablet computer. The computing device holder 37 may include at least one spigot hole that allows the at least one photography light 34 to be mounted onto the computing device holder 37 along with the desired computing device. The computing device holder 37 can be mounted directly onto the at least one telescopic pole 4 using a support-attachment clamp 25. In this embodiment, the computing device holder 37 is pivotally connected to the proximal clamping jaw 26 of the support-attachment clamp 25. The computing device holder 37 can also be mounted onto the mount body 7 using a rotating arm. The computing device holder 37 is pivotally connected to an end of the rotating arm, while the other end of the rotating arm is rotatably connected to a cylindrical protrusion of the mount body 7. The cylindrical protrusion is terminally integrated onto the mount body 7, opposite to the adapter-receiving fixture 31. In other embodiments, other holders or mounts can be implemented to support other photography accessories.

Although the invention has been explained in relation to its preferred embodiment, it is to be understood that many other possible modifications and variations can be made without departing from the spirit and scope of the invention.

What is claimed is:

1. A backdrop-and-lighting hanging kit comprising:

a plurality of elongated supports;

a plurality of accessory mounts;

each of the plurality of accessory mounts comprising a mount body, an accessory-attachment mechanism, and a support-attachment mechanism;

the accessory-attachment mechanism being connected adjacent to the mount body;

the support-attachment mechanism being removably attached adjacent to the mount body, offset from the accessory-attachment mechanism; and at least one specific elongated support from the plurality of elongated supports and at least one specific accessory mount from the plurality of accessory mounts being arranged into an operative configuration, wherein the specific elongated support and the specific accessory mount are used to hold in place at least one backdrop pole and/or at least one photography light.

2. The backdrop-and-lighting hanging kit as claimed in claim 1 further comprising:

the specific elongated support being at least one metal base;

the support-attachment mechanism of the specific accessory mount comprising a support-attachment base, a plurality of support-attachment magnets, a support-attachment adapter, and a plurality of release levers;

the plurality of support-attachment magnets being serially connected into the support-attachment base;

the plurality of support-attachment magnets being magnetically engaged along the at least one metal base;

the support-attachment adapter being connected adjacent to the support-attachment base, offset from the plurality of support-attachment magnets;

the plurality of release levers being positioned offset from each other; and the plurality of release levers being operatively integrated into the support-attachment body, wherein the plurality of release levers is used to disengage the plurality of support-attachment magnets from the at least one metal base.

3. The backdrop-and-lighting hanging kit as claimed in claim 2, wherein the support-attachment base is positioned perpendicular to the at least one metal base.

4. The backdrop-and-lighting hanging kit as claimed in claim 2, wherein the support-attachment base is positioned parallel to the at least one metal base.

5. The backdrop-and-lighting hanging kit as claimed in claim 1 further comprising:

the specific elongated support being at least one telescopic pole;

the support-attachment mechanism of the specific accessory mount comprising a support-attachment clamp and a support-attachment adapter;

the support-attachment clamp comprising a proximal clamping jaw and a distal clamping jaw;

the proximal clamping jaw being laterally pressed against the at least one telescopic pole;

the distal clamping jaw being laterally pressed against the at least one telescopic pole, opposite to the proximal clamping jaw; and the support-attachment adapter being connected adjacent to the proximal clamping jaw, opposite to the at least one telescopic pole.

6. The backdrop-and-lighting hanging kit as claimed in claim 5 further comprising:

the support-attachment mechanism of the specific accessory mount further comprising at least one support-attachment spacer; and the support-attachment spacer being positioned in between the support-attachment clamp and the at least one telescopic pole.

7. The backdrop-and-lighting hanging kit as claimed in claim 1 further comprising:

the specific elongated support being at least one telescopic pole;

the support-attachment mechanism of the specific accessory mount comprising a support-attachment base, a support-attachment socket, and a support-attachment adapter;

the support-attachment socket being connected adjacent to the support-attachment base;

the support-attachment adapter being connected adjacent to the support-attachment base, offset from the support-attachment socket; and a free end of the at least one telescopic pole being attached into the support-attachment socket.

8. The backdrop-and-lighting hanging kit as claimed in claim 1 further comprising:

each of the plurality of accessory mounts further comprising an adapter-receiving fixture;

the adapter-receiving fixture being connected adjacent to the mount body, offset from the accessory-attachment mechanism; and a support-attachment adapter of the support-attachment mechanism for the specific accessory mount being attached into the adapter-receiving fixture.

9. The backdrop-and-lighting hanging kit as claimed in claim 1 further comprising:

the accessory-attachment mechanism of the specific accessory mount comprising a tube clamp, an accessory-attachment cylinder, a fixed pole-situating saddle, and a pole-restraining tether;

the tube clamp being connected adjacent to the mount body, opposite to the support-attachment mechanism;

the tube clamp being laterally pressed around the accessory-attachment cylinder;

the fixed pole-situating saddle being laterally connected to the accessory-attachment cylinder, offset from the tube clamp; and the pole-restraining tether being tensionably attached to the fixed pole-situating saddle.

10. The backdrop-and-lighting hanging kit as claimed in claim 1 further comprising:

the accessory-attachment mechanism of the specific accessory mount comprising a tube clamp, an accessory-attachment cylinder, and a pole-restraining clamp;

the tube clamp being connected adjacent to the mount body, opposite to the support-attachment mechanism;

the tube clamp being laterally pressed around the accessory-attachment cylinder; and the pole-restraining clamp being laterally connected to the accessory-attachment cylinder, offset from the tube clamp.

11. The backdrop-and-lighting hanging kit as claimed in claim 1 further comprising:

the accessory-attachment mechanism of the specific accessory mount comprising a tube clamp, an accessory-attachment cylinder, and a light-restraining male fastener;

the tube clamp being connected adjacent to the mount body, opposite to the support-attachment mechanism;

the tube clamp being laterally pressed around the accessory-attachment cylinder; and the light-restraining male fastener being terminally connected to the accessory-attachment cylinder, offset from the tube clamp.

12. The backdrop-and-lighting hanging kit as claimed in claim 1 further comprising:

the accessory-attachment mechanism of the specific accessory mount comprising a saddle-securing slot, a saddle-securing insert, a free pole-situating saddle, and a pole-restraining tether;

the saddle-receiving slot laterally traversing into the mount body, offset from the support-attachment mechanism;

the saddle-securing insert being attached into the saddle-securing slot;

the free pole-situating saddle being connected adjacent to the saddle-securing insert, external to the saddle-securing slot; and the pole-restraining tether being tensionably attached to the mount body, adjacent to the free pole-situating saddle.

13. The backdrop-and-lighting hanging kit as claimed in claim 1 further comprising:

the accessory-attachment mechanism of the specific accessory mount comprising an accessory-attachment carriage, a carriage-securing lock, a saddle-securing slot, a saddle-securing insert, a free pole-situating saddle, and a pole-restraining tether;

the accessory-attachment carriage being slidably attached along the mount body;

the carriage-securing lock being operatively integrated between the mount body and the accessory-attachment carriage, wherein the carriage-securing lock is used to secure the accessory-attachment carriage in place along the mount body;

the saddle-receiving slot laterally traversing into the accessory-attachment carriage, opposite to the mount body;

the saddle-securing insert being attached into the saddle-securing slot;

the free pole-situating saddle being connected adjacent to the saddle-securing insert, external to the saddle-securing slot; and the pole-restraining tether being tensionably attached to the accessory-attachment carriage, adjacent to the free pole-situating saddle.

14. The backdrop-and-lighting hanging kit as claimed in claim 1 further comprising:

the accessory-attachment mechanism of the specific accessory mount comprising an accessory-attachment carriage, a carriage-securing lock, a tube clamp, an accessory-attachment cylinder, and a light-restraining male fastener;

the accessory-attachment carriage being slidably attached along the mount body;

the carriage-securing lock being operatively integrated between the mount body and the accessory-attachment carriage, wherein the carriage-securing lock is used to secure the accessory-attachment carriage in place along the mount body;

the tube clamp being connected adjacent to the accessory-attachment carriage, opposite to the mount body;

the tube clamp being laterally pressed around the accessory-attachment cylinder; and the light-restraining male fastener being terminally connected to the accessory-attachment cylinder, offset from the tube clamp.

* * * * *